United States Patent
Fischer et al.

(10) Patent No.: US 10,723,207 B2
(45) Date of Patent: Jul. 28, 2020

(54) MODULE CARRIER FOR A DOOR MODULE OF A MOTOR VEHICLE DOOR AND METHOD OF PRODUCING THE SAME

(71) Applicant: BROSE FAHRZEUGTEILE GMBH & CO. KOMMANDITGESELLSCHAFT, BAMBERG, Bamberg (DE)

(72) Inventors: Matthias Fischer, Itzgrund (DE); André Lehnhardt, Eltmann (DE); Norman Hümmer, Ebensfeld (DE); Michael Jahn, Baunach (DE); Hans Herzog, Strullendorf (DE); Michael Thienel, Thurnau (DE); Gerhard Hofmann, Bamberg (DE); Raimund Aschmutat, Grub am Forst (DE); Werner Stammberger, Grub am Forst (DE); Michael Bernert, Redwitz (DE)

(73) Assignee: BROSE FAHRZEUGTEILE GMBH & CO. KOMMANDITGESELLSCHAFT, BAMBERG, Bamberg (DE)

( * ) Notice: Subject to any disclaimer, the term of this patent is extended or adjusted under 35 U.S.C. 154(b) by 120 days.

(21) Appl. No.: 15/565,385

(22) PCT Filed: May 3, 2016

(86) PCT No.: PCT/EP2016/059871
§ 371 (c)(1),
(2) Date: Oct. 9, 2017

(87) PCT Pub. No.: WO2016/177716
PCT Pub. Date: Nov. 10, 2016

(65) Prior Publication Data
US 2018/0117998 A1 May 3, 2018

(30) Foreign Application Priority Data

May 5, 2015 (DE) .......... 10 2015 005 885
Sep. 10, 2015 (DE) .......... 10 2015 217 348

(51) Int. Cl.
*B60J 5/04* (2006.01)
*B29C 45/16* (2006.01)

(52) U.S. Cl.
CPC ......... *B60J 5/0416* (2013.01); *B29C 45/1671* (2013.01); *B60J 5/042* (2013.01);
(Continued)

(58) Field of Classification Search
CPC ...... B60J 5/0416; B60J 5/0484; B60J 5/0455; B60J 5/042
See application file for complete search history.

(56) References Cited

U.S. PATENT DOCUMENTS 4,328,642 A * 5/1982 Presto .................... B60J 5/0406
49/502
5,040,334 A * 8/1991 Dossin .................. B60J 5/0448
296/146.5
(Continued)

FOREIGN PATENT DOCUMENTS

CN  1241500 A  1/2000
CN  1243076 A  2/2000
(Continued)

OTHER PUBLICATIONS

Japanese Decision of Grant for Japanese Application No. 2017-557446 dated Apr. 9, 2019, 3 pages.
(Continued)

*Primary Examiner* — Marcus Menezes
(74) *Attorney, Agent, or Firm* — Lewis Roca Rothgerber Christie LLP

(57) ABSTRACT

It is provided a module carrier for a door module of a motor vehicle door, wherein at least one functional element is to be fixed to the module carrier. The module carrier is formed substantially by an organic sheet and is delimited by an encircling outer edge with at least one sealing element. On the module carrier, there is provided a multiplicity of interfaces firstly for fixing the module carrier to a door structure of a motor vehicle door and secondly for connecting the at least one functional element and/or further components of the door module to the module carrier.

22 Claims, 13 Drawing Sheets

(52) U.S. Cl.
CPC ............ *B60J 5/0418* (2013.01); *B60J 5/0425* (2013.01); *B60J 5/0426* (2013.01); *B60J 5/0455* (2013.01); *B60J 5/0463* (2013.01); *B60J 5/0481* (2013.01); *B60J 5/0484* (2013.01)

(56) References Cited

U.S. PATENT DOCUMENTS

| | | | |
|---|---|---|---|
| 5,190,803 | A | 3/1993 | Goldbach et al. |
| 6,139,088 | A * | 10/2000 | Okamoto ............... B60J 5/0416 296/146.1 |
| 6,874,279 | B1 | 4/2005 | Weber et al. |
| 9,168,815 | B2 * | 10/2015 | Weber .................... B60J 5/0422 |
| 2001/0038228 | A1 * | 11/2001 | Morrison ............... B60J 5/0416 296/146.5 |
| 2002/0007598 | A1 * | 1/2002 | Nishikawa ............. B60J 5/0416 49/502 |
| 2003/0188492 | A1 | 10/2003 | Bonnett et al. |
| 2003/0218356 | A1 | 11/2003 | Emerling et al. |
| 2004/0012219 | A1 * | 1/2004 | Banks .................... B60J 5/0416 296/39.3 |
| 2004/0049989 | A1 | 3/2004 | Florentin et al. |
| 2005/0115155 | A1 * | 6/2005 | Ottino ................... B60J 5/0416 49/502 |
| 2005/0200159 | A1 | 9/2005 | Eckhart et al. |
| 2006/0000149 | A1 * | 1/2006 | Radu ...................... B60J 5/0416 49/502 |
| 2006/0264554 | A1 * | 11/2006 | Lustiger ................... C08J 5/046 524/451 |
| 2006/0265963 | A1 * | 11/2006 | Winborn ............... B60J 5/0418 49/502 |
| 2007/0062123 | A1 | 3/2007 | Kruger et al. |
| 2010/0084887 | A1 | 4/2010 | Kruger et al. |
| 2010/0084888 | A1 | 4/2010 | Ishitobi et al. |
| 2011/0023367 | A1 * | 2/2011 | Barr ....................... B60J 5/0416 49/349 |
| 2011/0078957 | A1 | 4/2011 | Deschner |
| 2012/0036780 | A1 | 2/2012 | Pleiss et al. |
| 2012/0241999 | A1 | 9/2012 | Kroner |
| 2013/0057018 | A1 | 3/2013 | Reese |
| 2014/0208656 | A1 * | 7/2014 | Fortin ....................... B60J 5/06 49/449 |
| 2014/0361576 | A1 | 12/2014 | Storgato et al. |
| 2015/0047264 | A1 | 2/2015 | Kobayashi |
| 2016/0039272 | A1 * | 2/2016 | Kroack ................. E05F 11/382 403/380 |
| 2016/0056511 | A1 | 2/2016 | Schmid et al. |
| 2016/0136870 | A1 | 5/2016 | Thienel et al. |

FOREIGN PATENT DOCUMENTS

| | | | |
|---|---|---|---|
| CN | 1424958 A | 6/2003 | |
| CN | 1659051 A | 8/2005 | |
| CN | 104169115 A | 11/2014 | |
| CN | 105377523 A | 3/2016 | |
| DE | 29808833 U1 | 8/1998 | |
| DE | 19804781 A1 | 8/1999 | |
| DE | 199 44 916 A1 | 3/2001 | |
| DE | 10052739 A1 | 5/2002 | |
| DE | 10133421 A1 | 1/2003 | |
| DE | 102005011075 A1 * | 9/2006 | ............ B60J 5/0404 |
| DE | 102005033115 A1 | 1/2007 | |
| DE | 102006037157 A1 | 3/2007 | |
| DE | 102006002436 A1 | 7/2007 | |
| DE | 102006017424 A1 | 10/2007 | |
| DE | 202006018071 U1 | 5/2008 | |
| DE | 102008024742 A1 | 11/2009 | |
| DE | 102009039498 A1 | 1/2011 | |
| DE | 102009040901 A1 | 3/2011 | |
| DE | 102010014510 A1 | 10/2011 | |
| DE | 102010053381 A1 | 6/2012 | |
| DE | 102012023588 A1 | 7/2013 | |
| DE | 102013001943 A1 | 3/2014 | |
| DE | 202012104145 U1 | 3/2014 | |
| DE | 102013210094 A1 | 10/2014 | |
| DE | 102013213711 A1 | 1/2015 | |
| EP | 0 370 342 A2 | 5/1990 | |
| EP | 1 275 540 B1 | 1/2003 | |
| EP | 1 486 366 A2 | 12/2004 | |
| EP | 0 955 191 B1 | 4/2005 | |
| EP | 2 272 706 B1 | 1/2011 | |
| JP | 7-13535 | 3/1995 | |
| JP | 2001-503696 | 3/2001 | |
| JP | 2008-254471 | 10/2008 | |
| JP | 2012-520198 | 9/2012 | |
| JP | 2013-107521 A | 6/2013 | |
| JP | 2014-184765 A | 10/2014 | |
| JP | 2015-209146 A | 11/2015 | |
| JP | 2009-154580 A | 7/2016 | |
| JP | 2016-153235 | 8/2016 | |
| WO | WO 99/39931 | 8/1999 | |
| WO | WO 99/59833 | 11/1999 | |
| WO | WO 01/39952 A1 | 6/2001 | |
| WO | WO 2008/061906 A2 | 5/2008 | |
| WO | WO 2010/135562 A2 | 11/2010 | |

OTHER PUBLICATIONS

Japanese Decision of Grant for Japanese Application No. 2017-557448 dated Apr. 16, 2019, 3 pages.
Japanese Decision of Grant for Japanese Application No. 2017-557449 dated Apr. 16, 2019, 3 pages.
European Examination Report cited in corresponding EP Application No. 16 720 417.1-1015 dated Dec. 18, 2018, 4 pages, with English Translation, 2 pages.
CN Office action dated Nov. 28, 2019 cited in corresponding CN Application No. 201680026362.5, 6 pages.
CN Office action dated Dec. 2, 2019 cited in corresponding CN Application No. 201680026352.1, 8 pages, with English translation, 4 pages.
English Translation of CN Office action dated Nov. 28, 2019 cited in corresponding CN Application No. 201680026362.5 submitted on Jan. 10, 2020, 2 pages.
Chinese Office action dated Jan. 6, 2020 issued in corresponding CN Application No. 201680025997.3, 8 pages, with English translation, 2 pages.

* cited by examiner

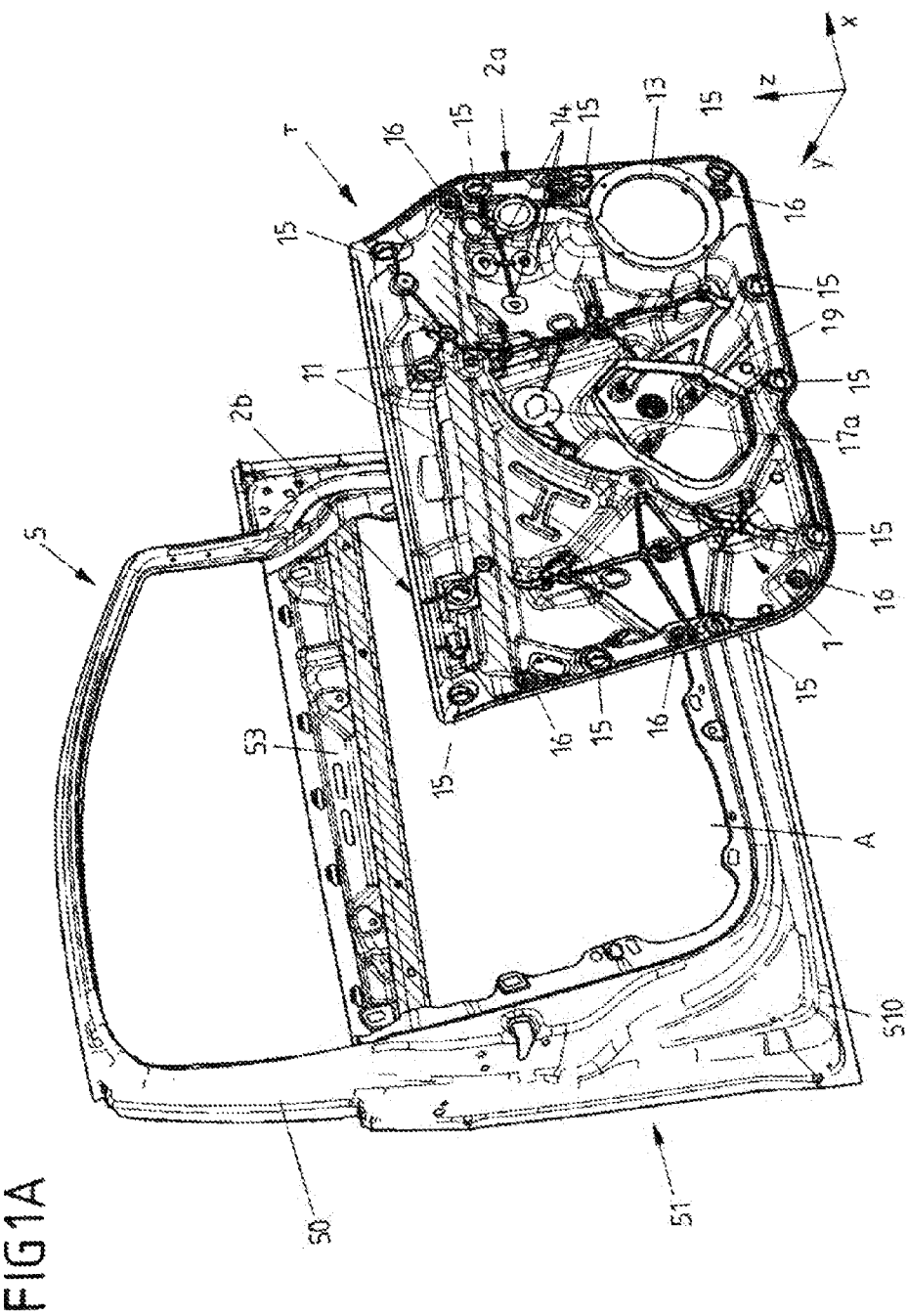

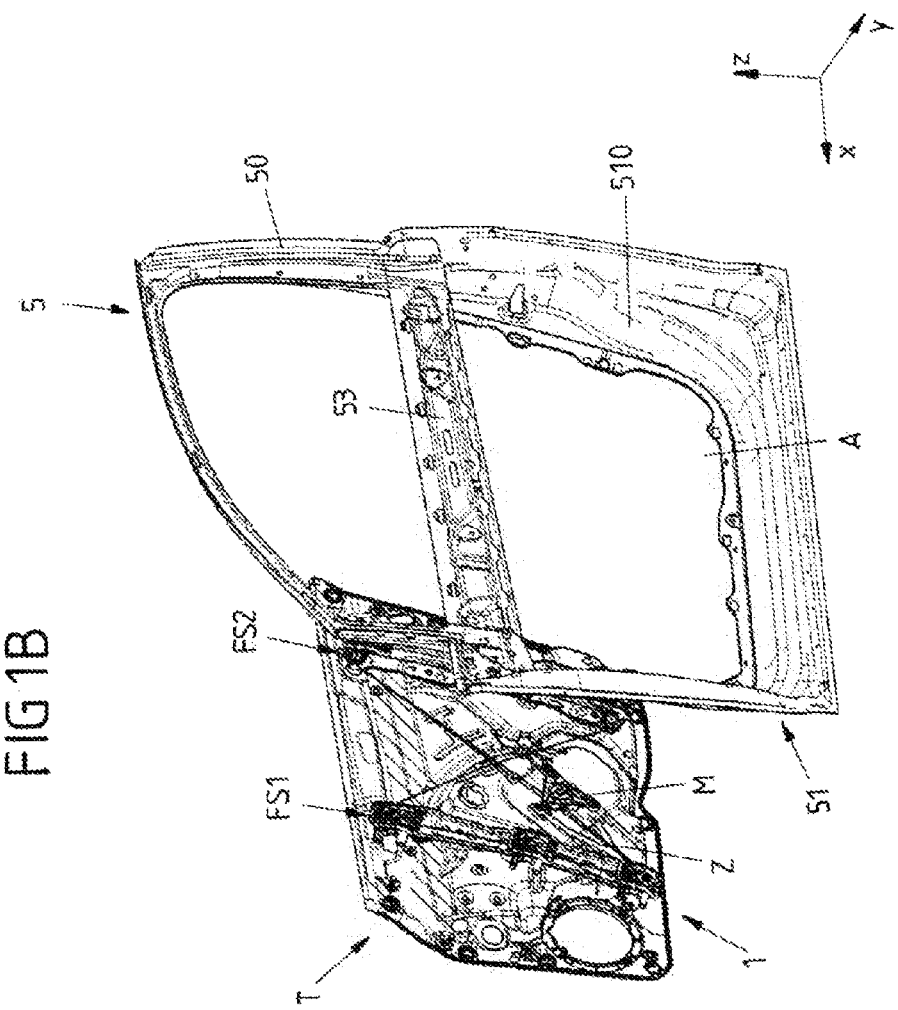

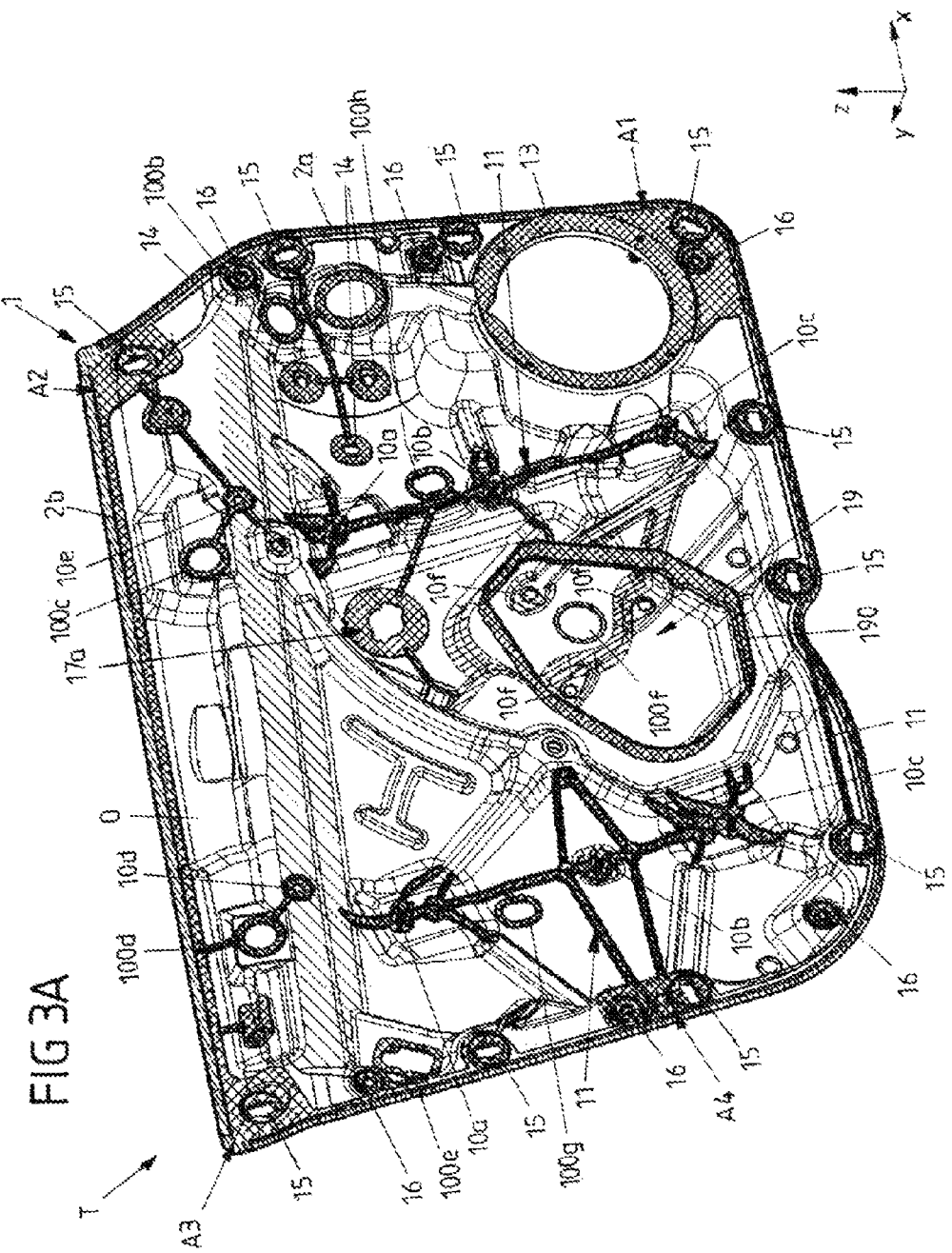

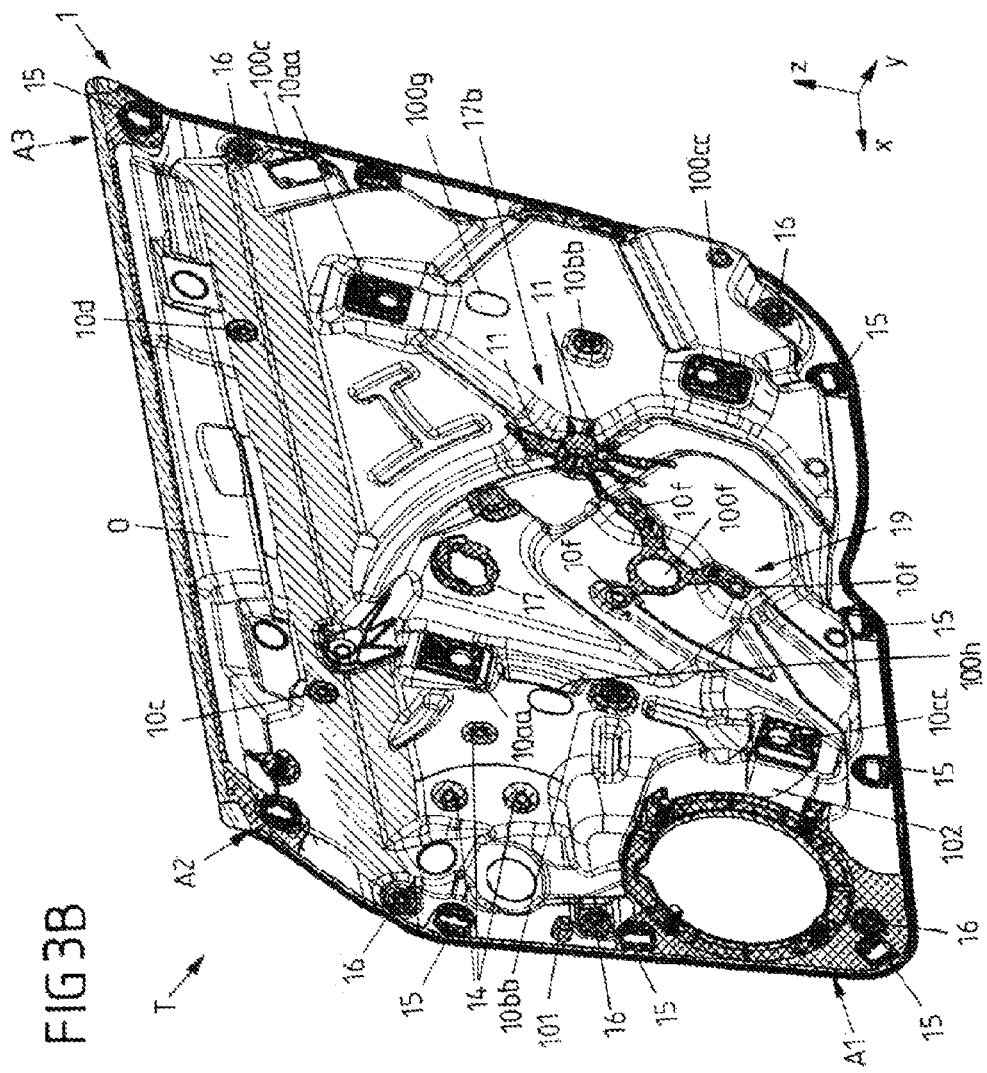

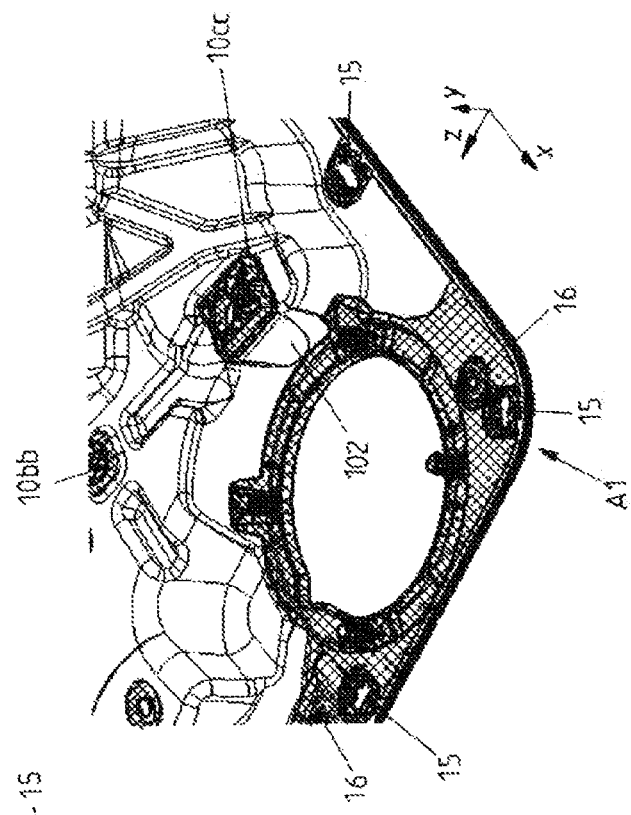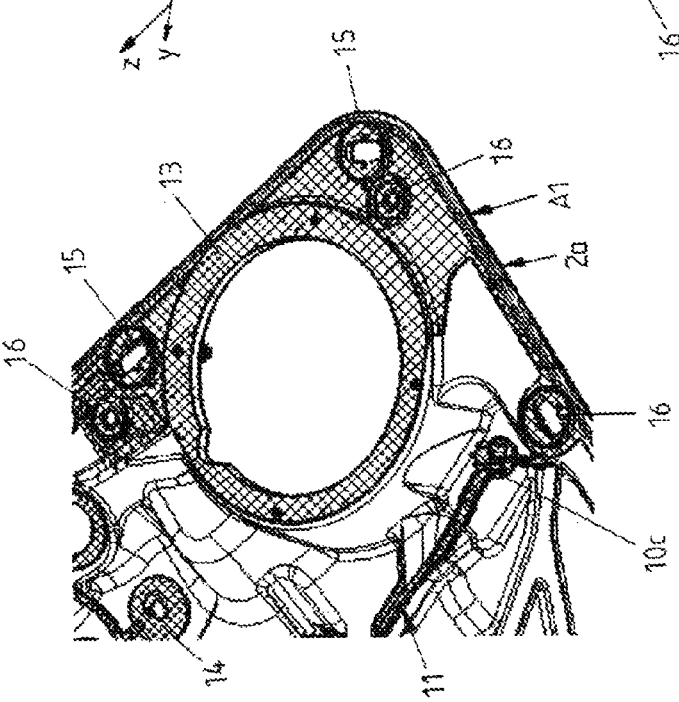

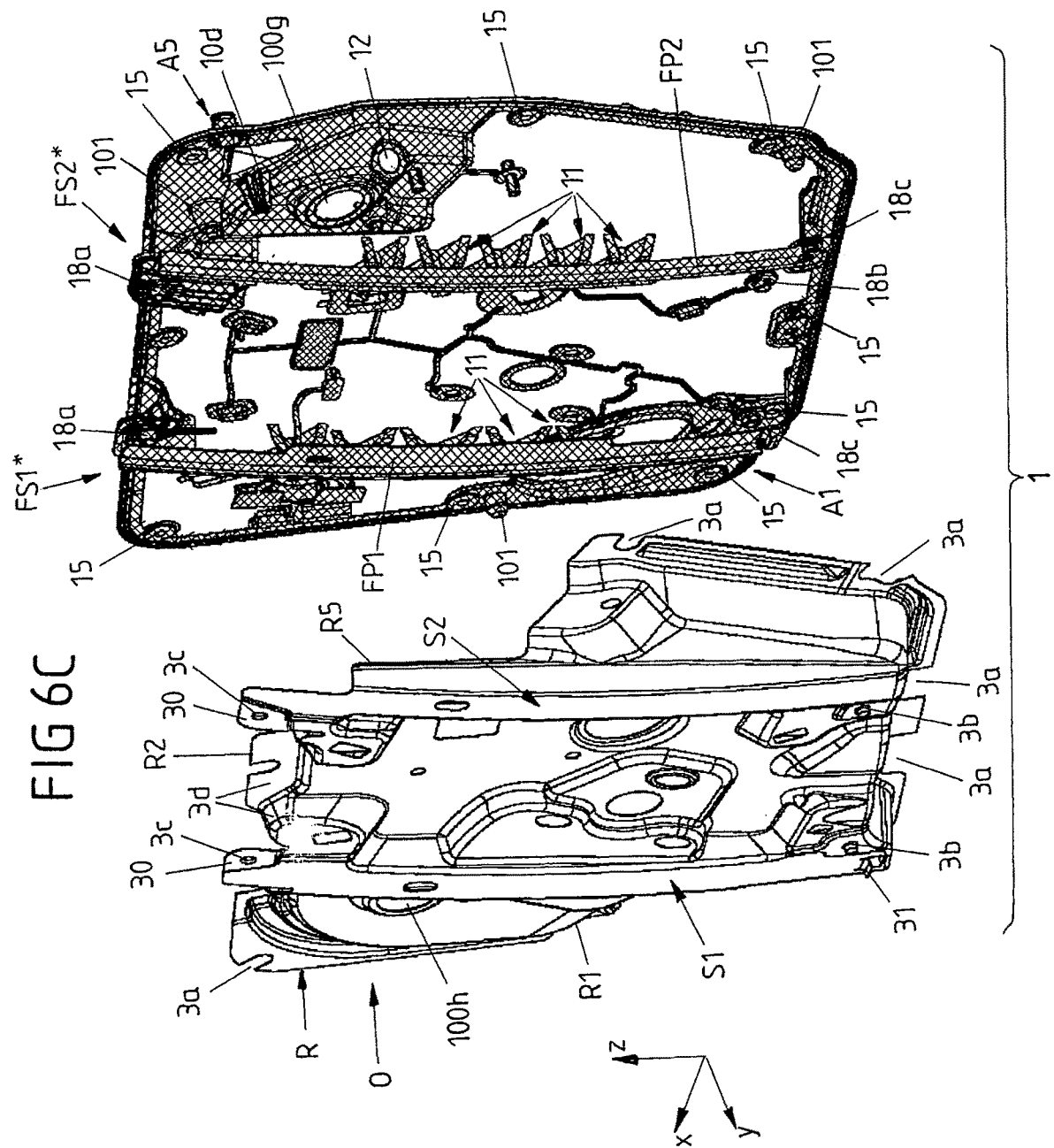

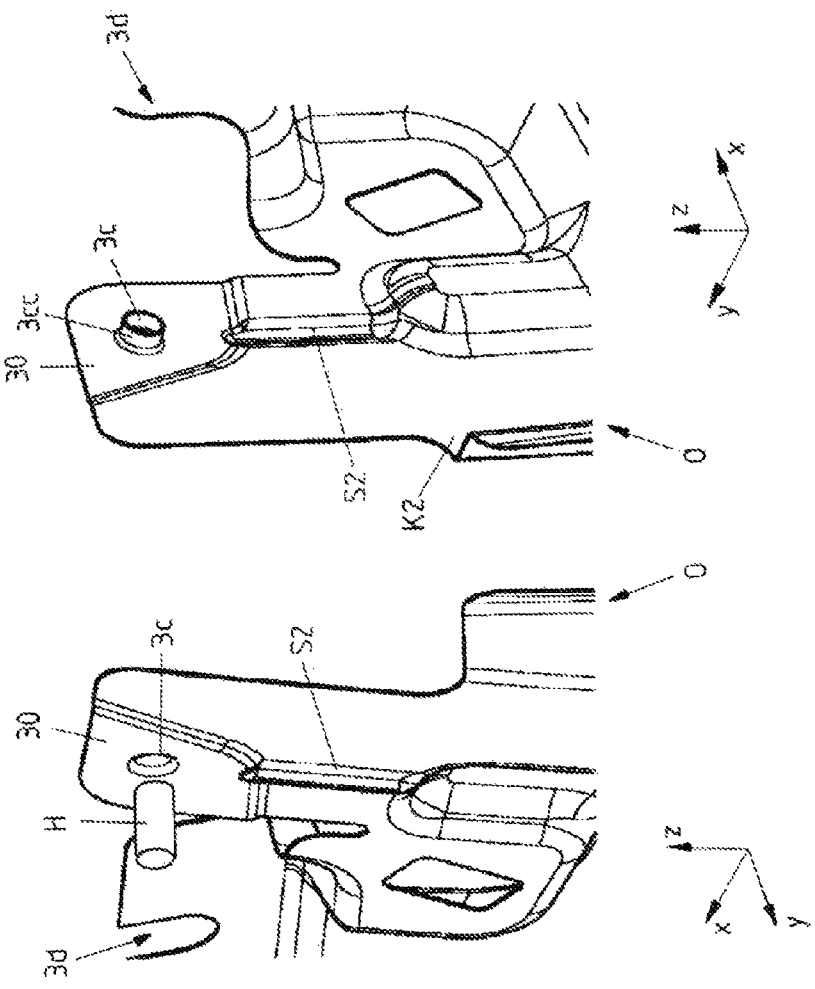

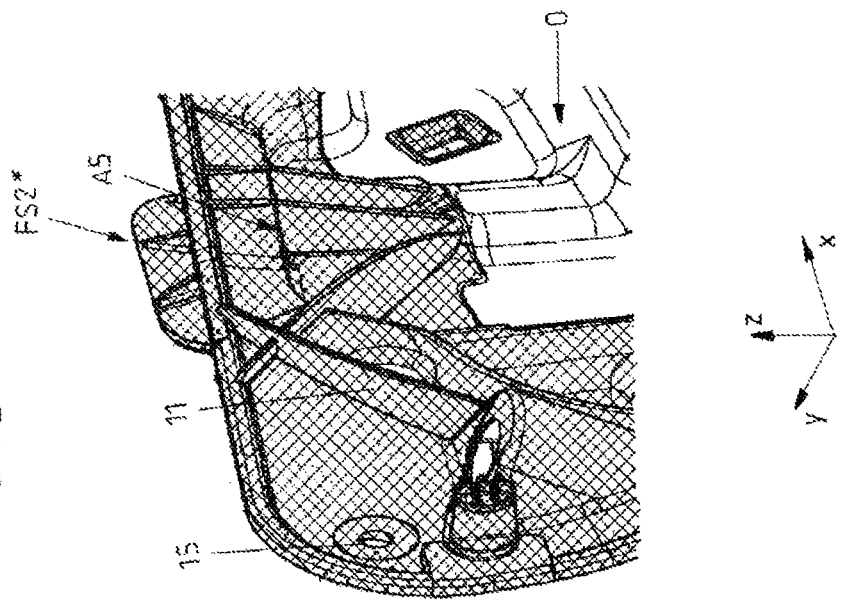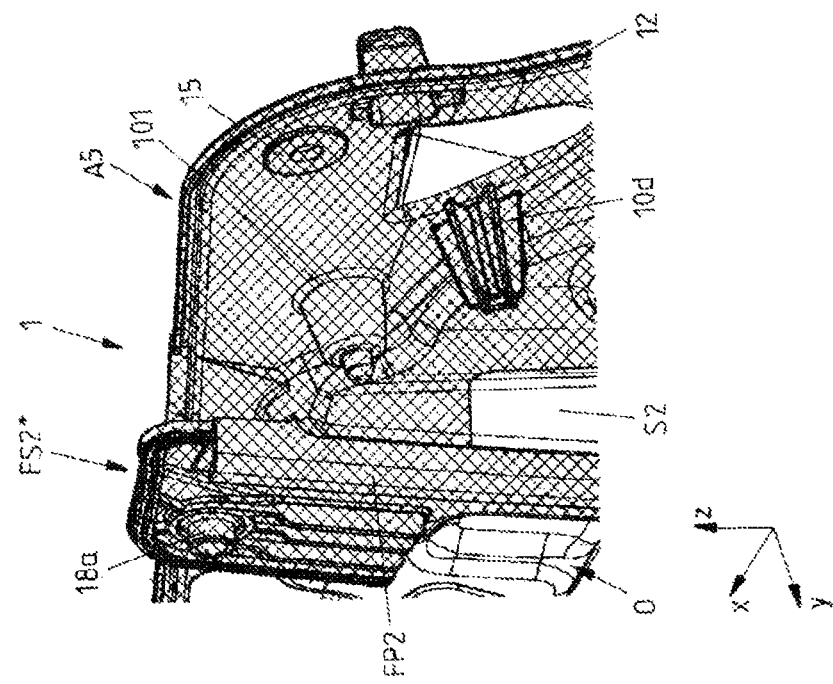

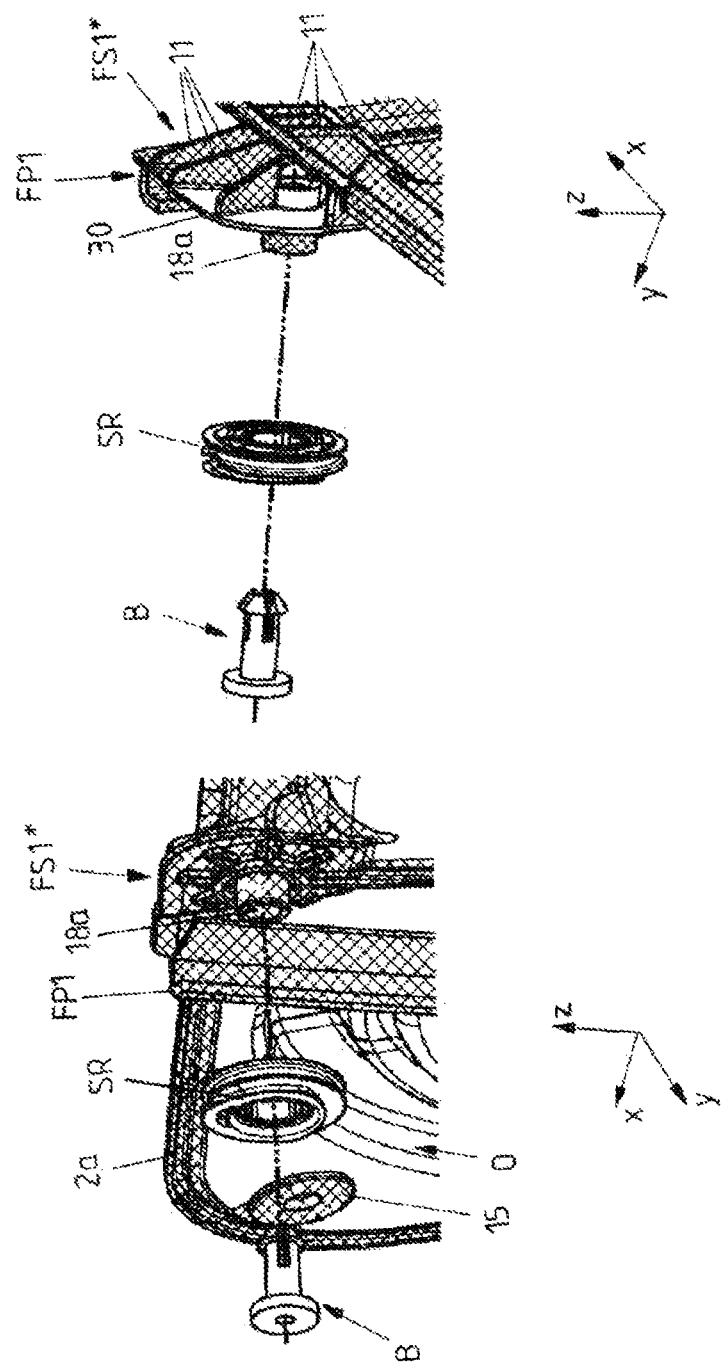

MODULE CARRIER FOR A DOOR MODULE OF A MOTOR VEHICLE DOOR AND METHOD OF PRODUCING THE SAME

CROSS-REFERENCE TO A RELATED APPLICATION

This application is a National Phase Patent Application of International Patent Application Number PCT/EP2016/059871, filed on May 3, 2016, which claims priority of German Patent Application Number 10 2015 005 885.1, filed on May 5, 2015 and of German Patent Application Number 10 2015 217 348.8, filed on Sep. 10, 2015, the contents of all of which are incorporated herein by reference.

BACKGROUND

The invention relates to a module carrier 1 and to a method for producing a module carrier.

Such a module carrier for a door module of a motor vehicle door normally bears multiple functional elements, for example parts of a window regulator for the adjustment of a window pane of the motor vehicle door, at least one loudspeaker or parts of a door-closing system. It is known for a module carrier of said type to be formed substantially by an organic sheet and for at least one seal to be arranged on an encircling outer edge of the module carrier, by means of which seal a sealed connection of the module carrier to a door structure of the motor vehicle door can be realized.

The fact that the module carrier is formed substantially by organic sheet means in this case that the organic sheet forms that part of the module carrier which is subjected to the major part of the forces that act under normal operating conditions. This may be in particular that part of the module carrier on which one or more guide rails of a window regulator are provided. A (coherent) part (which for example bears one or more guide rails) of the module carrier composed of organic sheet, or multiple parts (which for example bear one or more guide rails) of the module carrier composed of organic sheet extend for example over approximately 30% or more of the area of the module carrier. In particular, the organic sheet may extend over more than 40% and generally over at least 50% of the area of the module carrier, such that the organic sheet thus also makes up a corresponding fraction of more than 40% or approximately 50% or more of the surface of the module carrier. To fully utilize the strength advantages of the organic sheet, it is generally sought to maximize the fraction of the area of the module carrier made up by the organic sheet. A multi-part form of the organic sheet on a module carrier is not ruled out here.

A major constituent part of the module carrier is for example a panel-like semifinished part, which is composed of an organic sheet. Thus, the organic sheet defines a substantially areal extent of the module carrier, though may be supplemented by further components or materials. For example, metallic elements and/or plastics elements may be incorporated into the organic sheet or attached to the organic sheet.

The organic sheet involves a thermoplastics material reinforced with endless fibers, wherein endless fibers are embedded in the form of lays, wovens or knits composed of glass fibers, Kevlar fibers, carbon fibers or plastics fibers into a thermoplastic matrix. A suitable thermoplastics material for the matrix is for example polyamide owing to its good adhesion characteristics with respect to the fibers.

The expression "reinforced with endless fibers" is to be understood to mean that the length of the fibers used for the reinforcement is limited substantially by the size of the panel-like organic sheet. Generally, a fiber has no discontinuities within the organic sheet.

Normally, on a module carrier for a door module, there are provided multiple types of interfaces which serve on the one hand for the fixing of the module carrier to a door structure of a motor vehicle door and on the other hand for the connection of the functional elements and/or further components of the motor vehicle door to the module carrier. Such interfaces are defined for example by fastening openings for the fixing of the module carrier to a door structure. Likewise, it is generally the case that multiple fastening openings, screw bosses and/or bearing points and surfaces are formed on the module carrier, which permit an intended connection of functional elements and/or of at least one further component, for example of a door inner lining, to the module carrier. Furthermore, it is normally the case that at least one passage opening for a functional element is formed on the module carrier. It is then for example possible for a component coupled to a functional element or a part of the functional element itself to engage through the module carrier or to extend through the module carrier through a passage opening of said type. For example, a passage opening of said type serves for the leadthrough of an actuating linkage, of a cable or of a (drive) shaft.

In the case of a module carrier which is formed substantially by organic sheet, the formation of defined interfaces and/or passage openings by means of the organic sheet itself is generally possible only within certain limits, because a local deformation of the organic sheet gives rise to tensile forces which, owing to the fibers, propagate relatively extensively through the module carrier. Also, passage openings formed out of the organic sheet itself often cannot be readily produced with the desired precision and with the narrow tolerances that must be adhered to specifically in the automotive sector for industrial mass production.

From DE 10 2010 053 381 A1, it has hitherto merely been known to provide molded-on portions composed of thermoplastics material on an organic sheet. The difficulties that arise in the use of an organic sheet as the main constituent part of a module carrier for a door module of a motor vehicle door are however not discussed in said document.

SUMMARY

It is therefore an object of the invention to further improve a module carrier, which is formed substantially by an organic sheet, for a door module of a motor vehicle door, and in particular to reduce the abovementioned disadvantages.

Said object is achieved both by means of a module carrier having features as described herein and by means of a production method for a module carrier as described herein.

The invention proposes in particular a module carrier for a door module of a motor vehicle door, in which, on the outer edge of the module carrier, there is provided at least one first molded-on portion composed of thermoplastics material, which at least partially borders a central region of the module carrier and defines the at least one interface for the fixing of the module carrier to a door structure of a motor vehicle door and/or for the fixing of a further component of the motor vehicle door to the module carrier and/or receives or forms an edge-side seal element of the module carrier, and, at least in the central region of the module carrier, there is provided on the module carrier at least one second molded-on portion composed of thermoplastics material which defines an interface for a functional element to be fixed to the module carrier and/or defines a passage opening and/or which forms at least one section of a functional element.

It is thus the basic concept of the invention firstly to form required structures at a region at the edge or close to the edge of the module carrier by means of molded-on thermoplastics material, and secondly to likewise form interfaces and/or openings at a central region of the module carrier by means of molded-on thermoplastics material and/or to form at least one section of a functional element itself by means of said material. In this way, structures which are to be provided or which are required on the module carrier, in particular moldings, depressions and openings that are to be provided on said module carrier, can be reduced in terms of their number or the degree of spatial deformation, and/or can be formed with much greater tolerances, because the desired precision is ensured by means of the thermoplastic molded-on portions. Thus, in defining the corresponding regions of the module carrier by means of molded-on plastics material, greater position is achieved more easily than is possible by means of a deformation of the organic sheet. In the case of an edge-side molded-on portion, the thermoplastics material is provided in a region close to the edge and preferably also forms a section of the edge of the module carrier. By contrast, a second molded-on portion in the central region of the module carrier refers in the present case to a situation where the molded-on plastics material is spaced apart from an edge of the organic sheet and in particular is not directly connected to said edge.

The thermoplastics material that is used for the first (edge-side) molded-on portion and thus for a molded-on portion of a first type may in this case be identical to a thermoplastics material that is used for a second, inner molded-on portion and thus a molded-on portion of a second type. In particular, depending on production method, specification or occurring loads and/or the desired component characteristics, the plastics materials for a first and a second molded-on portion may also differ. In preferred design variants, it is generally the case that multiple first edge-side molded-on portions and/or multiple second inner molded-on portions, which are in each case spatially separate from one another, are provided on the module carrier. For example, it is possible for multiple second molded-on portions to be provided which form interfaces, passage openings and/or sections of a functional element or of multiple functional elements at different locations on the module carrier.

In one design variant, a first, edge-side molded-on portion forms at least one areally extending section of the module carrier. In this variant, it is thus the case that a part of the module carrier, which extends preferably areally along a main plane, is formed entirely by means of molded-on thermoplastics material. For example, here, a first edge-side molded-on portion completely forms one edge region of the module carrier in which no organic sheet is present. Here, the areally extending section composed of thermoplastics material may for example form a section of the module carrier which is subjected to lower mechanical load or which has pronounced spatial structures which can be produced only with difficulty in direct conjunction with organic sheet. Such purely thermoplastic sections may even form more than 10% of the surface area of the module carrier.

Alternatively or in addition, a first edge-side molded-on portion may extend along the entire outer edge of the module carrier. Thus, in this way, it is possible in particular for an encircling seal element of the module carrier to be formed, or an encircling, preferably channel-like receptacle for a seal element separately mounted or molded thereon.

In a first edge-side molded-on portion composed of thermoplastics material, there is preferably formed at least one fastening opening as an interface for the fixing of the module carrier to a door structure. Such a fastening opening is thus formed here entirely by the thermoplastics material that is molded onto the organic sheet in the region of the outer edge of the module carrier, without a sheet edge of the organic sheet itself forming, for this purpose, a part of the functional surface of the interface to be formed.

It may however alternatively also be provided that an opening is provided at a sheet edge of the organic sheet, onto and through which thermoplastics material is molded in order to form a fastening opening at said opening. The dimensions of the fastening opening composed of thermoplastics material are in this case then smaller than the dimensions of the opening in the sheet edge of the organic sheet, and are preferably also subject to a narrower tolerance range. Openings provided in the organic sheet for the formation of interfaces are thus dimensioned to be large enough that, before the molding-on of thermoplastics material, the demanded positional precision of an interface for the formation of said interface can be ensured. For this purpose, in particular, the tolerances to be expected owing to the deformation of the organic sheet are observed.

In a first edge-side molded-on portion, there may furthermore also be formed at least one fastening opening as an interface for the fixing of a door inner lining. Here, it is preferably the case that a first, edge-side molded-on portion composed of thermoplastics material forms fastening openings both for the fixing to a door structure and for the fixing of a door inner lining to the module carrier.

In one exemplary embodiment, the first, edge-side molded-on portion forms at least one interface for the fixing of a loudspeaker to the module carrier and/or at least one screw boss. Such an interface for a loudspeaker and/or a screw boss may be formed in this case in particular on an areally extending section composed of thermoplastics material.

Alternatively or in addition, in the first, edge-side molded-on portion, there may be formed at least one passage opening for the leadthrough of a cable or of a linkage through the module carrier, and/or a passage opening for a tool for the mounting of a window regulator on the module carrier. A passage opening for a tool for the mounting of a window regulator normally serves in this case for making it possible, in the case of a module carrier that has already been mounted on the door structure, for a window pane inserted into the door structure to be connected to a driver of the window regulator. Thus, the window pane can normally be lowered into a wet space in the motor vehicle door, which is delimited at one side in particular by a door outer panel and at the other side by a door inner panel and by an outer side of the module carrier mounted on the door inner panel. Then, through a closable installation opening on the module carrier, the driver to be connected to the window pane remains accessible from an inner side, facing toward a dry space, of the module carrier. In one design variant of a module carrier according to the invention, it is then specifically the case that a passage opening of said type is formed by molded-on thermoplastics material on the module carrier.

The second, inner molded-on portion, that is to say the molded-on portion provided in the central region, preferably forms at least one interface for a) the fixing of a guide rail of a window regulator, and/or
b) the fixing of a drive of a window regulator, and/or c) the fixing of a control unit, and/or
d) the fixing of an airbag sensor, and/or
e) the fixing of a door pull-closed handle, and/or
f) the fixing of a diverting element over which a traction mechanism of a window regulator is diverted.

The above mentioned interfaces may in this case include in particular fastening openings, screw bosses and/or bearing surfaces composed of molded-on thermoplastics material.

In one exemplary embodiment, a second, inner molded-on portion composed of thermoplastics material forms a sound-insulating wall. Such a sound-insulating wall is preferably provided in the region of a bearing point for a window regulator drive on an inner side, facing toward the dry space, of the module carrier, for the purposes of dampening noises that occur during the operation of the window regulator. Such a molded-on sound-insulating wall may for example be of lamellar form, in order to thereby make it possible, owing to the flexibility thus realized, for prefabricated sound insulation pads to be easily received in the interior of a border defined by the sound-insulating wall.

In the case of an interface being formed for a diverting element, for example a diverting piece or a cable roller for a traction mechanism, which is to be diverted, of a window regulator, provision is made in one design variant for thermoplastics material to be provided for this purpose on a turned-out portion composed of organic sheet. Such a turned-out portion may form a sleeve-like projection on the module carrier, such that, by means of thermoplastics material molded thereon, a bearing point with high load capacity for a cable roller can be formed. Ultimately, the cable diverting forces are transmitted directly from the thermoplastic molded-on portion to the relatively stable turned-out portion of the organic sheet. In one refinement, the turned-out portion composed of organic sheet has an irregular contour at its free protruding end. For example, the free protruding end is serrated and/or notched. In this way, during the encapsulation of an edge of the protruding end with thermoplastics material, a rotationally fixed connection between the organic sheet and the molded-on thermoplastics material can be achieved more easily. The molded-on thermoplastics material is in this case connected to the turned-out portion not only cohesively but also in positively locking fashion.

A second molded-on portion, which is provided in the central region, forms for example a passage opening for a cable, an (actuating) linkage and/or a drive shaft of a drive for a window regulator, such that the cable, the linkage and/or the drive shaft can extend through the module carrier through said passage opening.

Alternatively or in addition, a second molded-on portion may form a passage opening for the mounting of a window regulator on the module carrier. In particular, it may be provided that both a first, edge-side molded-on portion and a second, inner molded-on portion form in each case at least one passage opening and/or at least one interface for a functional element. In one design variant, it is for example the case that a passage opening for the mounting of a window regulator is formed at a first location on the module carrier by means of an opening in the organic sheet (possibly with molded-on plastics material), and at a second location, a passage opening of said type is formed entirely by a second molded-on portion composed of thermoplastics material.

In one design variant, the second molded-on portion, which is provided in the central region, composed of thermoplastics material forms at least one section of a guide rail of a window regulator. Thus, in this variant, the guide rail is fully produced only after the molding of the thermoplastics material onto the organic sheet. Here, the molded-on plastics material preferably forms a guide profile of the guide rail, by means of which guide profile a guide track for a driver guided displaceably on the guide rail is predefined. A guide profile of said type normally has a longitudinally extending edge web which is engaged around by the driver and along which the driver is displaceably guided for the purposes of adjustment, that is to say raising and lowering, of a window pane connected to said driver. By virtue of the fact that, for example, the guide profile of the guide rail is formed by the retroactively molded-on plastics material, but a stability profile, which accommodates the forces that arise during the operation of the window regulator, of the guide rail is formed by the organic sheet, the different constituent parts of the guide rail can be formed on the module carrier by means of different materials in a functionally optimized manner.

In one design variant, against this background, at least one longitudinally extending pedestal is formed on the module carrier, which pedestal protrudes in elevated fashion on one side of the module carrier and is utilized as a stability profile of a guide rail, for example for a single-cable or dual-cable window regulator. Thermoplastics material is then molded onto said longitudinally extending pedestal, which material forms the guide profile of the guide rail. Additionally, the molded-on thermoplastics material in the region of one end of the pedestal may also additionally form a bearing point for a diverting element, such as for example a rigid diverting piece or a cable roller. In one variant, the molded-on plastics material forms not only a bearing point but even a rigid diverting piece for a flexible traction mechanism of the window regulator.

For the formation of an interface for the fixing of a diverting element by means of the molded-on thermoplastics material, a bearing section which adjoins the pedestal along a direction of longitudinal extent of said pedestal may be formed out of the organic sheet. Then, at said bearing section of the organic sheet, which is for example formed in the manner of a lug, the desired geometry and structure of the interface for the fixing of the diverting element can be formed by means of the molded-on thermoplastics material.

In one design variant, the formed-out bearing section and at least one region of the organic sheet adjoining said bearing section lie in mutually offset planes, such that a free space is present between them in the organic sheet. Thus, the organic sheet has been locally cut open, for example cut into, for the forming-out of a bearing section which protrudes out of a main plane spanned by the organic sheet. As a result of the forming-out of the bearing section, a free space is formed between the edges of the cut-open portion. This is however disadvantageous for example with regard to the separation of a wet space and a dry space within the motor vehicle door. If the offset between the bearing section and the adjoining organic sheet section is present in a region close to the edge of the module carrier, it is furthermore the case that a continuous seal edge for the sealing abutment of the module carrier against the door structure is no longer ensured owing to the offset. Against this background, it is provided in one design variant that a free space which is present between the bearing section composed of organic sheet and a section composed of organic sheet adjoining said free space is closed by molded-on thermoplastics material. An offset in the organic sheet which arises as a result of the bearing section formed out of the organic sheet in the region of a cut-open portion is thus compensated for by molded-on thermoplastics material.

In one possible refinement, it is additionally provided that the molded-on thermoplastics material which forms the interface for the fixing of the diverting element is connected by means of a stiffening structure composed of molded-on thermoplastics material to the plastics material which closes the free space and/or to a section composed of organic sheet which borders the free space, in order to increase the stiffness of the module carrier in the region of the interface.

In one design variant, a stop region for delimiting an adjustment travel of the window regulator driver is formed on a section of the organic sheet which adjoins the pedestal along a direction of longitudinal extent of said pedestal. For example, a stop region which protrudes in the manner of a tongue or in the manner of a lug is formed out of the areal organic sheet. To said stop region there is then preferably attached a molded-on portion composed of thermoplastics material, for the purposes of forming a stop element for the driver, against which stop element the driver abuts when the window pane connected thereto has been lowered or raised to a maximum extent. Preferably, a stop element of said type formed by a formed-out stop region of the organic sheet and plastics material molded thereon is provided at least at a lower end of the pedestal in relation to the intended installed state of the module carrier. In this way, the maximally lowered position of the windowpane is hereby predefined.

In a variant in which molded-on thermoplastics material forms the guide profile of a guide rail on a protruding, longitudinally extending pedestal composed of organic sheet, it may be provided that the thermoplastics material is molded through the organic sheet of the pedestal. Here, it is thus the case that, during the production process, thermoplastics material is molded at least partially through the organic sheet from one side of the module carrier, such that, on one side of the organic sheet, the desired structure for the guide profile is formed, but at the same time, thermoplastics material is present on the opposite side of the organic sheet. Onto said thermoplastics material present on the opposite side of the organic sheet, it is possible for thermoplastics material to be molded such that a stiffening structure for the guide rail is formed. In this way, the stiffening structure is then, by means of the at least partially molded-through thermoplastics material for the guide profile, also connected directly to the stiffening structure molded onto the opposite side.

The variant discussed above for a direct connection of two structures composed of molded-on thermoplastics material formed on opposite sides of the module carrier by means of at least one through-molding of the organic sheet is self-evidently conceivable not only in conjunction with a molded-on section of a guide rail. For example, it may be provided at virtually any desired interface (on a first side of the module carrier) that a molded-on support or stiffening structure (on the opposite side of the module carrier) is connected at least partially directly, by means of at least one local through-molding through the organic sheet, to molded-on thermoplastics material for precisely said interface.

Basically, in the case of a through-molding of the organic sheet with thermoplastics material, it is not imperative for a passage opening through which the plastics material can flow to be formed in the organic sheet for this purpose. For example, even without such a passage opening, the organic sheet makes it possible, in the case of corresponding selection of temperature and pressure, for thermoplastics material to be molded through the organic sheet. In order for regions at which molded-on thermoplastics material is to extend through the organic sheet to possibly be defined in a targeted manner on the organic sheet, it is possible for regions with reduced wall thickness to be provided on the organic sheet.

A formed-out, longitudinally extending pedestal composed of organic sheet self-evidently need not necessarily form a part of a guide rail for a window regulator. In one variant, a pedestal of said type is provided merely for predefining an interface for a separately produced guide rail. The guide point is connected and fixed to the module carrier at the pedestal.

For a weight reduction, it may basically be provided that a protruding, longitudinally extending pedestal which is formed out of the organic sheet is not formed as a solid body composed of organic sheet. Rather, it is preferable for a pedestal of said type to be formed by means of corresponding deformation of a thin-walled organic sheet, such that the pedestal protrudes on one side of the module carrier and a channel-like depression is formed on an opposite side of the module carrier. In a refinement based on this, for the local stiffening of the pedestal and of the channel, a support or stiffening structure is formed by thermoplastics material injected into the channel. Here, it is consequently the case that a support or stiffening structure is formed by means of a second, inner molded-on portion. Here, a support or stiffening structure of said type may have at least one reinforcement or stiffening rib or a rib structure with multiple such ribs. Here, a rib for stiffening the pedestal and the channel preferably runs, at least in one section, transversely with respect to a direction of longitudinal extent of the pedestal and of the channel. By means of a rib structure with multiple reinforcement or stiffening ribs, it is also possible for mutually opposite inner walls of the channel to be connected to one another. Alternatively or in addition, it may self-evidently also be provided that the channel be filled at least in sections with thermoplastics material injected therein, in order to achieve an at least local stiffening.

A support or stiffening structure formed by means of molded-on thermoplastics material may alternatively or additionally also be provided at an interface for the fixing of a functional element, in particular in order to connect the outer edge of the module carrier to said interface and thereby increase the stiffness of the module carrier in the region of the at least one sealing element which is provided at the outer edge. In this way, by means of the support or stiffening structure composed of molded-on thermoplastics material, a sealing edge stiffness of the module carrier is increased in targeted fashion.

In one design variant, a support or stiffening structure composed of molded-on thermoplastics material is formed with at least one (stiffening or reinforcement) rib and is provided at an interface for the fixing of a door pull-closed handle. Here, the support or stiffening structure preferably has, at the interface, multiple ribs which are arranged in radiating fashion at a fastening opening, formed by molded-on plastics material, of the interface. It is thus the case here that, by means of one and the same molded-on plastics material, or by means of different molded-on plastics materials, not only is a fastening opening for the fixing of the door pull-closed handle formed, but also a support or stiffening structure with multiple ribs, by means of which a stiffness is increased in the region of said fastening opening for the purposes of accommodating the acting loads.

As has already been partially discussed above, by means of at least one local through-molding through the organic sheet of the module carrier, thermoplastics material for the support or stiffening structure may at least partially also be present on an opposite side of the organic sheet. The thermoplastics material of the support or stiffening structure formed on one side of the organic sheet thus extends at least partially through the organic sheet. In this way, an improved fixing of the molded-on portion to the organic sheet can be achieved.

In one refinement, the part extending through the organic sheet may also be connected directly to thermoplastics material molded onto the opposite side, by means of which for example an interface for a functional element or at least one section of a functional element is formed. In one design variant, it is for example the case that a support or stiffening structure is molded onto the organic sheet on an inner side of the module carrier. Said support or stiffening structure is, by means of at least local through-molding through the organic sheet of the module carrier, connected at least partially directly to the thermoplastics material, molded onto the organic sheet on the outer side of the module carrier, for a fastening point of a door pull-closed handle and/or to the stiffening structures hereby formed on the outer side at the fastening point.

In one design variant, the organic sheet of the module carrier forms a wall which adjoins an interface, formed from molded-on thermoplastics material, for the fixing of a loudspeaker. Said wall is then preferably formed so as to extend at least in sections in the form of an angled portion out of a main plane of the module carrier, along which the module carrier extends substantially areally, in the direction of an interface, formed from molded-on thermoplastics material, for the fixing of a guide rail. The wall thus connects two interfaces composed of thermoplastics material to one another, and, by means of its extent at an angle with respect to the main plane, provides a structure composed of organic sheet by means of which the guide rail interface is supported. Thus, primarily forces perpendicular to the main plane act on said interface. Said forces can be introduced directly into the supporting wall composed of organic sheet.

A first molded-on portion may engage around at least one section of an edge of the organic sheet, and likewise, a first and/or a second molded-on portion may engage around an edge of a passage opening in the organic sheet, such that the respective edge is encapsulated with thermoplastics material. The molded-on thermoplastics material thus extends over the respective edge on two sides of the organic sheet and thus ensures an improved connection between organic sheet and thermoplastics material.

A further aspect of the invention is a method for producing a module carrier for a door module of a motor vehicle door. Here, in the context of a production method according to the invention, it is provided at least that, on an outer edge of the module carrier, thermoplastics material is molded on, in order to at least partially border a central region of the module carrier hereby and to define at least one interface for the fixing of the module carrier to a door structure of a motor vehicle door and/or for the fixing of a further component of the motor vehicle door to the module carrier and/or to receive or form an edge-side seal element of the module carrier, and, at least in the central region of the module carrier, additionally the same or a different thermoplastics material is molded onto the organic sheet, in order to define an interface for a functional element to be fixed to the module carrier and/or define a passage opening and/or to form at least one section of a functional element.

A module carrier according to the invention can be produced by means of a method according to the invention, such that advantages and features of design variants of a module carrier according to the invention as mentioned above and below also apply to a production method according to the invention, and vice versa.

A first, edge-side molded-on portion and a second, inner molded-on portion provided in the central region of the module carrier may be produced in one injection-molding process. This is advantageous in particular if identical thermoplastics material is used to produce the different types of molded-on portions. In an alternative design variant, the at least one first and the at least one second molded-on portion are produced in at least two successive and thus temporally separate injection-molding processes.

Depending on the desired design of the module carrier and in particular the number of interfaces and/or passage openings that are to be formed by means of thermoplastics material at an edge or at a central region of the module carrier, it is possible for multiple first and/or second molded-on portions composed of thermoplastics material to be formed on the organic sheet. A multiplicity of first and/or second molded-on portions may in this case be produced on the module carrier in a temporally and/or spatially offset manner with respect to one another.

For the formation of interfaces and/or passage openings on the organic sheet of the module carrier, provision may be made, in one design variant of a production method according to the invention, for outer edges of the organic sheet, which define the outer contour thereof, and/or edges of openings in the organic sheet to be encapsulated with thermoplastics material in order, in this way, to form a first and/or a second molded-on portion composed of thermoplastics material. Alternatively or in addition, the organic sheet may be at least locally through-molded with thermoplastics material in order to form, for example, an interface on the organic sheet for the module carrier to be produced.

BRIEF DESCRIPTION OF THE DRAWINGS

Further advantages and features of the invention will be discussed in the following description of exemplary embodiments on the basis of the figures.

FIG. 1A shows, in a view directed toward the inner side, a door structure of a motor vehicle and a module carrier of an associated door module.

FIG. 1B shows, in a view directed toward an outer side, the arrangement from FIG. 1A with functional elements additionally fixed to the module carrier.

FIGS. 3A to 3B show, in views directed toward the inner side (FIG. 3A) and the outer side (FIG. 3B), the module carrier from FIG. 2, with emphasis of molded-on portions composed of thermoplastics material provided on said module carrier.

FIGS. 5A to 5B show enlarged details from FIGS. 3A and 3B in views directed toward an interface for the fixing of a loudspeaker.

FIG. 6C shows, in a view directed toward the outer side, the module carrier, with emphasis of its constituent parts composed of organic sheet and molded-on thermoplastics material.

FIGS. 7A to 7B show enlarged details of the organic sheet of the module carrier from FIGS. 6A to 6C.

FIGS. 7C to 7D show the regions of the organic sheet as illustrated in FIGS. 7A and 7B with molded-on portions composed of thermoplastics material provided thereon.

FIGS. 8A to 8B show an enlarged detail of the module carrier from FIGS. 6A and 6B with a diverting element in the form of a cable roller and the associated (securing) bolt thereof in an exploded illustration.

DETAILED DESCRIPTION

Figure 2:
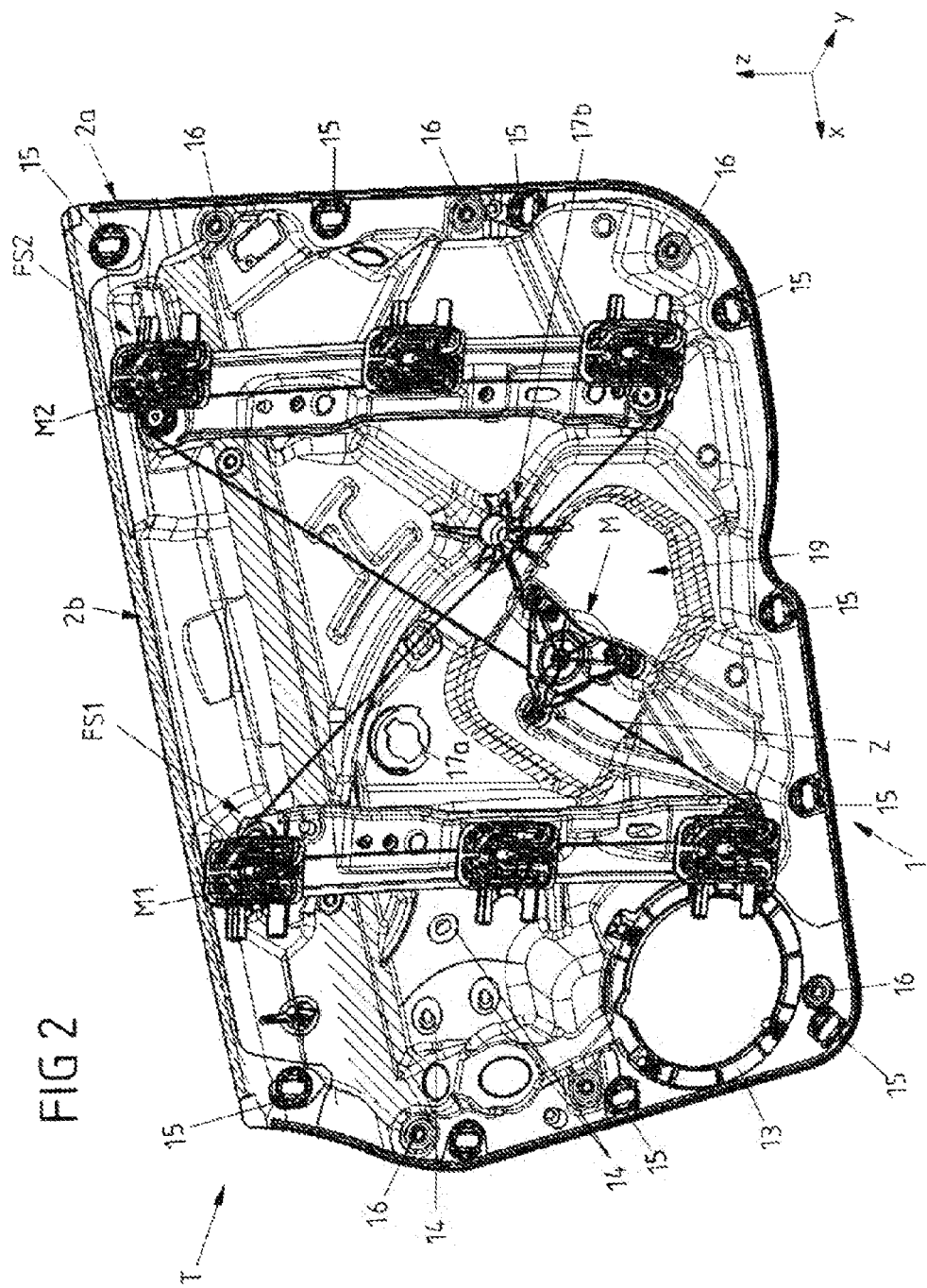
FIG. 2 shows an enlarged illustration of the outer side of the door module from FIG. 1B.

FIGS. 1A and 1B illustrate major elements of a motor vehicle door, including a door module T and a door structure 5. The door module T is designed for being fixed to the door structure 5. The door module T in this case comprises a module carrier 1 on which functional elements of the door module T can be mounted, specifically in particular before the door module T has been fixed to the door structure 5, as shown in FIGS. 1A and 1B.

In an intended installation situation of a motor vehicle door in a motor vehicle, said motor vehicle door, like the door structure 5 and the door module T as components of the motor vehicle door, has an inner side and an outer side. The inner side faces toward the interior space of the motor vehicle, and the outer side faces toward a region outside the motor vehicle.

It is furthermore possible, in relation to the intended installation situation of the motor vehicle door in the motor vehicle, to define a coordinate system for the motor vehicle door and the elements thereof. Here, the vehicle longitudinal axis x extends from a rear side of the motor vehicle to the front side thereof, that is to say along the direction of forward travel. The vehicle transverse axis y extends perpendicular to the vehicle longitudinal axis x between two opposite motor vehicle doors of the motor vehicle. The vehicle vertical axis z is defined in that it stands both perpendicular to the vehicle longitudinal axis x and to the vehicle transverse axis y. The vehicle vertical axis z extends from the floor of the motor vehicle toward the roof thereof.

FIG. 1A illustrates the inner sides of the door structure 5 and of the door module T, and FIG. 1B shows the outer side of the arrangement from FIG. 1A, but with additional functional elements that are not shown in FIG. 1A.

The door structure 5 comprises a window frame structure 50 and a door case 51. The window frame structure 50 and the door case 51 are, in the embodiment illustrated here, formed by a door inner panel 510. Alternatively, they may be formed for example by a plastics element or a composite material.

A breast delimitation 52 separates the window frame structure 50 from the door case 51. The breast delimitation 52 extends along the vehicle longitudinal axis x between the front side and the rear side of the door structure 5. The breast delimitation 52 may be formed for example as a stamped sheet part.

The door case 51 and the breast delimitation 52 surround a cutout A in the door structure 5. In the case of an intended fixing of the door module T to the door structure 5, the cutout A is covered by the door module T. In this way, a door module T together with the door structure 5 separates a wet space from a dry space of the motor vehicle door, in a known manner.

The dry space is situated in front of the inner side of the door module T, and the wet space is situated in front of the outer side of the door module T. In particular, elements of a motor vehicle door which are not sensitive to moisture are arranged in the region of the wet space. By contrast, in particular, elements of a motor vehicle door which are sensitive to moisture are arranged in the region of the dry space.

Correspondingly to the illustration of FIG. 1A, it is in particular the case, on the inner side of the module carrier 1, that multiple interfaces for the connection to the door inner panel 510 can be seen in the form of fastening openings 15. Said fastening openings 15 are in the present case designed for a bayonet connection at an edge of the module carrier 1. Furthermore, fastening openings 16 are also provided at the edge of the module carrier 1 for the connection to a door inner lining (not illustrated here). Said fastening openings 16 for the connection to the door inner lining are, like the fastening openings 15 for the connection of the module carrier 1 to the door inner panel 510, provided in an edge-side region of the module carrier 1.

A seal with seal elements 2a, 2b runs along the edge of the module carrier 1, for the purposes of enabling the module carrier 1 to be sealingly fixed to the door structures 5. The seal 2a, 2b is in this case divided into two seal sections; a U-shaped section of a seal element 2a, which extends along a front, lower and rear edge of the module carrier 1 (in relation to its intended installed state), and a rectilinearly running section of a seal element 2b at an upper edge, close to the breast, of the module carrier 1. Furthermore, on the module carrier, there are formed multiple interfaces 13, 14 and 17a for the fixing of functional components of the door module T. These include in particular an interface 13 for the fastening of a loudspeaker, a fastening point 14 in the form of multiple fastening openings for a control unit, and a fastening point 17a with a fastening opening for an airbag sensor.

Furthermore, a bearing point 19 for a window regulator drive is formed on the module carrier 1. Said bearing point 19 serves for the intended fastening of a drive motor of the window regulator drive to the inner side of the module carrier 1, such that, by means of said drive motor, drivers M1, M2 arranged on the outer side of the module carrier 1 can be displaced along associated guide rails FS1 and FS2 and a window pane of the motor vehicle door can be raised and lowered by external power. Said guide rails FS1 and FS2, as functional elements of the door module T, are illustrated in FIG. 1B and FIG. 2.

The drivers M1 and 2 are driven, so as to perform an adjustment movement along the guide rails FS1 and FS2, by means of a flexible traction mechanism in the form of a cable pull Z. Here, a drive motor of the window regulator drive drives a cable drum arranged on the outer side of the module carrier 1 in order to displace the drivers M1 and M2 by winding-up and unwinding of the criss-crossing cable pull Z. Said cable drum of the window regulator drive is mounted rotatably on a bearing plate. Said bearing plate is fixed, in the region of the bearing point 19 for the drive motor, to the opposite, outer side of the module carrier 1, and in the present case is formed substantially with a triangular outline.

The fastening points 14 for the control unit, the fastening point 17a for the airbag sensor and the fastening points for the bearing plate are in the present case provided in a central region of the module carrier 1, along with a fastening point 17b for a door pull-closed handle.

In addition to a passage opening for the fixing of the door pull-closed handle, the fastening point 17b forms a stiffening structure by means of multiple stiffening ribs running in radiating fashion with respect to the fastening opening. In this way, the module carrier 1 is locally stiffened in order to adequately withstand the forces which arise during the closing of the motor vehicle door and which are introduced into the module carrier 1 via the door pull-closed handle.

As is illustrated in more detail in particular in the further illustrations of FIGS. 3A to 3B, 4A to 4B and 5A to 5B, the module carrier 1 is formed substantially by an areally extending organic sheet O. Relief-like structures, and in particular also passage openings, are formed on said organic sheet O on the inner side and on the outer side of the module carrier 1. The structuring of the organic sheet O and the provision of passage openings on the organic sheet O serve here for the formation of interfaces for the fixing of the module carrier 1 to the door structures 5 and for the fixing of the door inner lining and for the definition of interfaces on the module carrier 1, to which functional elements of the door module T, such as for example the guide rails FS and FS2, are intended to be fixed. To reduce the stresses that arise within the organic sheet O as a result of the deformation of the organic sheet O and in order to more easily achieve narrower tolerances for the dimensions for the individual openings on the module carrier 1, and in order to optimize the production of the module carrier 1, thermoplastics material is molded onto the organic sheet O at various locations. It is then ultimately the case here that the individual interfaces, in particular any fastening openings, support and stiffening structures, and the seal elements 2a, 2b, are formed by means of the corresponding molded-on portions composed of thermoplastics material.

Here, thermoplastics material is molded in encircling fashion onto an edge of the organic sheet O on one side, such that the edge of the module carrier 1 is formed by means of said thermoplastics material. On the other side, it is also the case at a central region of the organic sheet O, that is to say a region enclosed by the sheet edge thereof, that multiple additional molded-on portions composed of thermoplastics material are provided, which form in particular the fastening points 14 for the control unit, the fastening point 17a for the airbag sensor, the fastening point 17b for the door pull-closed handle, passage openings 10a to 10f and 100a to 100h for various purposes, and support and stiffening structures 11.

A first, edge-side molded-on portion composed of thermoplastics material in this case forms surface sections A1 to A3 adjacent to the seal elements 2a and 2b. In said regions of the module carrier 1, no organic sheet O is present, it rather being the case that an edge of the organic sheet O has been encapsulated with thermoplastics material such that a section which supplements the organic sheet O and which co-defines the surface of the module carrier 1 is formed by means of the thermoplastics material.

Furthermore, on said surface sections A1, A2 and A3, there is formed in each case at least not only a part of a seal element 2a, 2b but also at least one fastening opening 15 for the connection to the door inner panel 510. In a surface section A1, there is furthermore formed the interface 13 for the loudspeaker, that is to say in particular a large-area opening into which the loudspeaker is to be inserted and to the edge of which the loudspeaker is to be fixed.

On the inner side of the module carrier 1, a further surface section A4 is formed by means of the thermoplastics material molded on at the edge side. Said further surface section extends in the present case as a layer over an organic sheet section. In this case, too, however, the molded-on thermoplastics material forms in particular a fastening opening 15 for the connection to the door inner panel 510. Here, however, as at other locations on the organic sheet O, a passage opening was already present in the organic sheet O before the plastics material was molded thereon. Here, however, it is only as a result of the molded-on thermoplastics material that the respective fastening openings 15 and 16 are formed with the desired narrow tolerance range.

The same applies to the fastening opening, and to an edge region adjoining this, of the interface 17a for the airbag sensor and the passage openings at the fastening points 14 for the control unit. Additional passage openings 100a to 100c and 10d, 10e which are to be provided on the module carrier 1 and which serve for example for the leadthrough of cables or linkage parts through the module carrier 1 are in this case also formed by means of thermoplastics material molded on remote from the edge of the module carrier 1.

In the region of the bearing point 19, not only is a passage opening 100f for a drive shaft of the drive motor of the window regulator drive formed by means of molded-on thermoplastics material, but fastening openings 10f for the fixing of the bearing plate M are also defined by means of said thermoplastics material. The molded-on thermoplastics material extends in this case on the outer side of the module carrier 1 such that, by means thereof, an edge of the centrally arranged passage opening 100f for the drive shaft is connected to the edges of the fastening openings 10f for the bearing plate M of the window regulator drive.

Furthermore, at the bearing point 19, a functional element in the form of a sound-insulating wall 190 is formed by molded-on thermoplastics material. Said sound-insulating wall 190 runs on the inner side of the module carrier 1 in fully encircling fashion around the bearing point 19 for the purposes of damping noises that arise during the operation of the window regulator drive.

Thermoplastics material, such as for example polyamide, molded onto the organic sheet O also defines, in this case, the interfaces for the fastening of the guide rails FS1 and FS2. Here, bearing or supporting surfaces 10aa, 10bb and 10cc are formed on the outer side of the module carrier 1 by means of molded-on plastics material. On the oppositely situated inner side of the module carrier 1, the molded-on plastics material forms the respective fastening point 10a, 10b or 10c with screw bosses, which simultaneously transition into support and stiffening structures 11 with multiple ribs.

Said support and stiffening structures 11 are also connected to passage openings 100g and 100h for access for a tool to the drivers M1 and M2. The passage openings 100g and 100h, the final dimensions of which are likewise predefined by the molded-on thermoplastics material, make it possible, after the attachment of the door module T to the door structure 5, for the drivers M1 and M2 to be connected in the intended manner, from the dry space side, to the window pane to be adjusted. The passage openings 100g and 100h can in this case be closed off, for example by means of a cover element (not illustrated here) which is composed of plastic and which can be plugged on, in order to ensure the separation of the wet and dry spaces.

In order, during the attachment of the door module T to the door structure 5, to keep the module carrier 1 in a desired relative position before the fixing is performed at the fastening openings 15, it is also the case that multiple positioning pegs 101 are formed by means of molded-on thermoplastics material. A positioning peg 101 engages into an associated opening on the door structure 5 and thus holds the door module T in position until it has been finally fixed.

By means of the rib-like support and stiffening structures 11 which extend, in part, over a large area and which are composed of molded-on thermoplastics material, it is also the case at some locations that interfaces in the form of the fastening points 10*a* to 10*cc* for the guide rail FS2, in the form of the fastening points 14 for the control unit and other inner regions of the module carrier 1 are connected in targeted fashion to the outer edge of the module carrier 1, in order to increase the stiffness of the module carrier 1 in the region of the seal 2*a*, 2*b* and thus increase the stiffness of a seal edge of the module carrier 1.

Figure 4B:
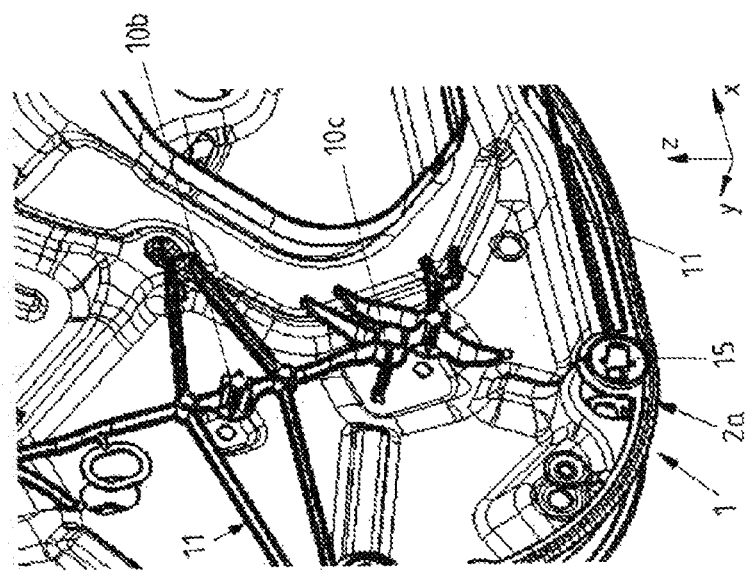
FIGS. 4A to 4B show enlarged details from FIGS. 3A and 3B in views directed toward an interface for the fixing of a guide rail of a window regulator.
Figure 4A:
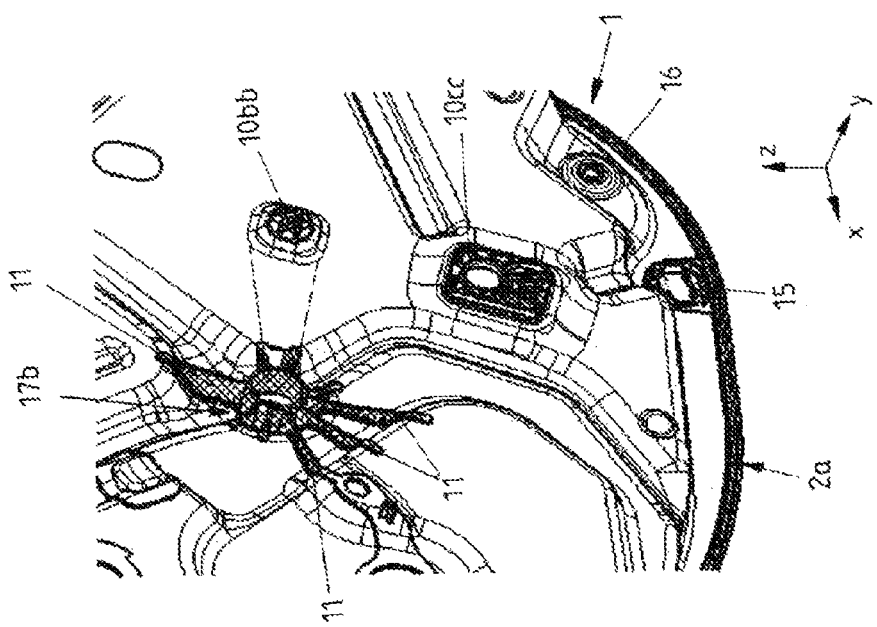

The detail illustrations of FIGS. 4A and 4B show for example in particular the molded-on stiffening structure 11 in the region of the fastening point 17*b* for the door pull-closed handle with multiple ribs extending in radiating fashion away from a fastening opening. In this case, too, the bearing or supporting surfaces 10*bb* and 10*cc* and the screw bosses at the fastening points 10*b* and 10*c* for the guide rail FS2 are illustrated on an enlarged scale.

Here, it may be provided that, for example, at least a part of the thermoplastics material of the fastening point 17*b* is molded through the organic sheet O on the outer side of the module carrier 1.

It may additionally be provided that a stiffening structure 11 is subsequently molded onto the oppositely situated inner side, such that the molded-through thermoplastics material of the fastening point 17*b* is at least partially directly connected to the thermoplastics material of the stiffening structure 11. It may alternatively basically also be provided that firstly the stiffening structure 11 is molded on on the inner side, wherein at least a part of the thermoplastics material molded on for this purpose is molded through the organic sheet O. During the subsequent molding-on of the thermoplastics material for the fastening point 17*b* on the oppositely situated outer side, it is then likewise the case that a direct connection of the two molded-on structures 17*b* and 11 is achieved. The two variants discussed above with at least partial through-molding of the organic sheet may in this case self-evidently also be applied at other interfaces.

The detail illustrations of FIGS. 5A and 5B show, in more detail, firstly the surface section A1 composed of thermoplastics material, which forms in particular the interface 13 for the loudspeaker. Also shown here are the bearing or supporting surfaces 10*bb* and 10*cc* and a screw boss of the fastening point 10*c* for the guide rail FS1. On the outer side of the module carrier 1, by means of the organic sheet O, a support is provided for the interface defined by the supporting surface 10*cc* for the guide rail FS1. Here, the organic sheet O has a wall 102 which extends as an angled portion out of a main plane spanned by the organic sheet O—in the present case substantially perpendicularly to said main plane—and which connects the molded-on surface section A1 to the molded-on bearing or supporting surface 10*cc* and supports said molded-on surface section.

FIGS. 6A to 6C, 7A to 7D, 8A to 8B and 9A to 9B show a further design variant of a module carrier 1 according to the invention for a door module of a motor vehicle door. Identical elements of the module carrier 1 are in this case denoted by corresponding reference designations.

Thus, it is also the case in the module carrier 1 of FIGS. 6A to 9B that an edge-side molded-on portion composed of thermoplastics material on an organic sheet O forms multiple fastening openings 15 for the connection to the door inner panel 510. In the present case, a continuously extending receptacle 12, which is configured for example in the manner of a channel, is provided at an edge, formed by molded-on plastics material, of the module carrier 1. A separately produced sealing element 2*a* may be inserted into said receptacle 12, or a sealing element 2*a* is molded into said receptacle in a subsequent injection-molding process.

In correlation with the exemplary embodiment, discussed above, of FIGS. 1A to 5B, it is also the case here that multiple passage and fastening openings and screw bosses 10*d*, 10*f*, 100*b*, 100*f*, 100*g*, 100*h* and 17*a* are formed on the organic sheet O of the module carrier 1 by means of molded-on thermoplastics material. Here, in this variant, a passage opening 100*h* for the connection of the driver M1 to the window pane is formed at an opening in the organic sheet O. A further passage opening 100*g* for the connection of the other driver M2 to the window pane is, by contrast, formed entirely by thermoplastics material molded onto the organic sheet O.

The passage openings 100*b* and 100*g* and a screw boss 10*d* and a positioning peg 101 are furthermore formed by a surface section A5 composed of thermoplastics material. Said surface section A5 is molded on at an edge section R5 of an edge R of the organic sheet O so as to encapsulate said edge section R5. Here, the surface section A5 defines more than ⅒, in the present case even more than ⅛, of the surface of the module carrier 1, and fully forms one of the four corners of the module carrier 1.

At an opposite corner region of the module carrier 1 there is provided a further surface section A1 composed of thermoplastics material. Said surface section is molded on at an edge section R1 of the edge R of the organic sheet O, likewise so as to encapsulate said edge section R1. The further surface section A1 in this case forms in particular the fastening point 13 for the loudspeaker, in addition to multiple fastening openings 15, a positioning peg 101 and a part of the receptacle 12 for the encircling seal element 2*a*.

By means of the surface sections A1 and A2 composed of molded-on thermoplastics material, a significant part of the surface, in the present case at least ⅛ of the surface, of the module carrier 1 is defined by thermoplastics material alone. Here, the module carrier 1 has its final shape imparted to it by means of the molded-on plastics material. In the present case, it is also in part the case that sections spanned by the organic sheet O in various planes are connected to one another in targeted fashion.

This is illustrated in particular on the basis of FIG. 6C. Here, the molded-on regions and the organic sheet O with its predefined structuring are shown in an exploded illustration. From this, it can be seen in particular that an edge R of the organic sheet O has, inter alia, multiple incisions or cutouts 3*a*, mutually offset attachment regions 3*d* and the edge sections R1 and R5 which are later encapsulated, as a result of which the organic sheet O deviates significantly from a rectangular shape. A substantially rectangular outline of the module carrier 1 is consequently obtained for the first time by means of the molded-on surface sections A1 and A5.

In the present case, two longitudinally extending pedestals S1 and S2 are formed on the organic sheet O of FIGS. 6A to 9B. These protrude on the module carrier 1 on an outer side, and run substantially along the vertical direction z in an intended installed state of the module carrier 1. The longitudinally extending, protruding pedestals S1 and S2 in this case form a stability profile of in each case one guide rail FS1*, FS2*. A major part of the transverse forces that arise during the operation of the window regulator is introduced by said stability profile S1, S2 into the organic sheet O.

A guide profile FP1, FP2 is provided for the sliding guidance of the drivers M1 and M2 on the guide rails FS1* and FS2*. Said guide profile FP1 or FP2 is in the present case formed in each case by molded-on thermoplastics material. The guide profiles FP1 and FP2 of the two guide rails FS1* and FS2* are thus molded on by means of onto the pedestals S1 and S2 or the stability profile thereby formed. In this way, the different functions to be performed by the guide rail FS1* or FS2* are performed by different materials and regions, by the stability profile S1 or S2 composed of organic sheet O, on the one hand, and by the guide profile FP1 or FP2 composed of molded-on thermoplastics material, on the other hand. Thus, there is a targeted functional separation by means of the materials used and the structures formed by them.

Figure 6A:
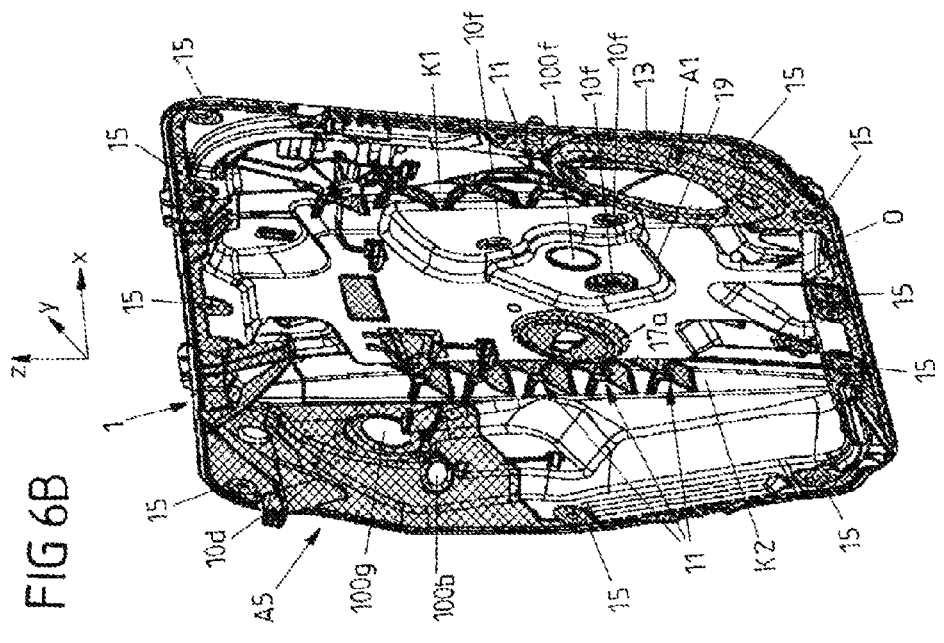
FIGS. 6A to 6B show, in views directed toward an outer side (FIG. 6A) and an inner side (FIG. 6B), a further exemplary embodiment of a module carrier according to the invention with different molded-on portions composed of thermoplastics material provided on said module carrier.
Figure 6B:
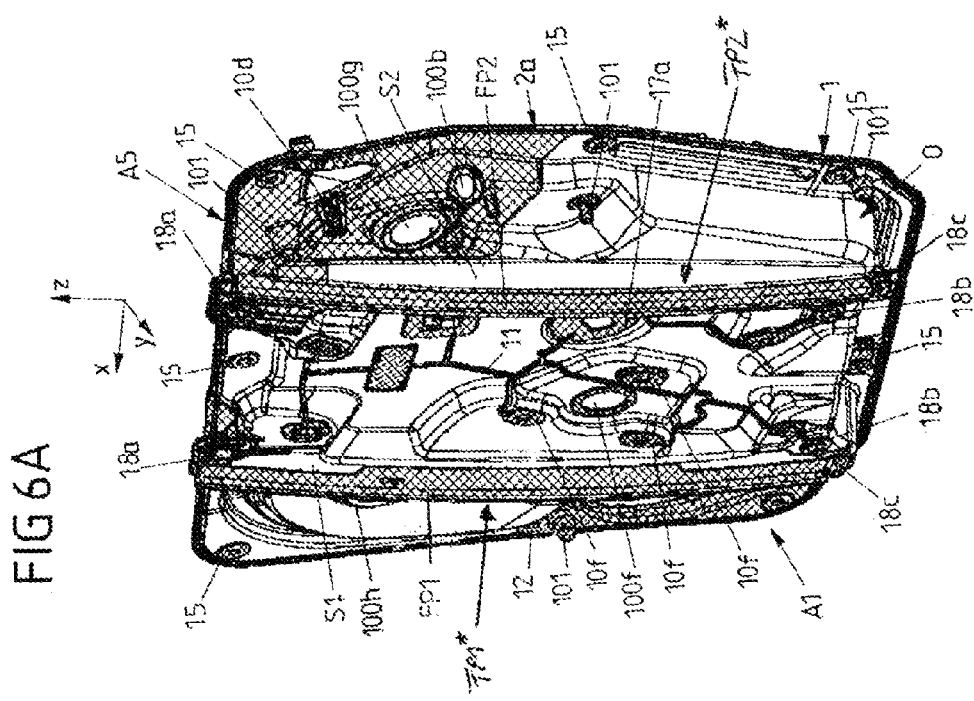

In order to increase the stiffness of the module carrier 1 specifically in the region of the pedestals S1 and S2, stiffening structures 11 are molded on, correspondingly to FIG. 6B, on the inner side of the module carrier 1. As a result of the formation of the pedestals S1 and S2 on the oppositely situated outer side of the module carrier 1, in each case one longitudinally extending channel K1 or K2 is formed on the inner side of said module carrier. The stiffening structures 11 with multiple criss-crossing ribs are molded into said channel, such that, in this way, in particular, the mutually oppositely situated inner walls of the respective channel K1 or K2 are connected to one another.

In this case, it may be provided that at least a part of the thermoplastics material of the stiffening structure 11 on the inner side is molded through the organic sheet O of the module carrier 1. If the respective guide profile FP1 or FP2 is molded onto the associated pedestal S1 or S2 only subsequently, the thermoplastics material of the guide profile FP1, FP2 is connected at least partially directly to the molded-through thermoplastics material of the stiffening structure 11. It may alternatively basically also be provided that firstly a guide profile FP1, FP2 is molded onto the respective pedestal S1 or S2, wherein at least a part of the thermoplastics material molded on for this purpose is molded through the organic sheet O. During the subsequent molding-on of the stiffening structure 11 on the oppositely situated inner side, it is then likewise the case that a direct connection of the two molded-on structures FP1 and 11 or FP2 and 11 is achieved.

The detailed illustrations of FIGS. 7A to 7D illustrate the region at an upper end of the guide rail FS2* of the module carrier 1 in more detail. Here, FIGS. 7A and 7B firstly show, in a view directed toward the outer and inner sides of the module carrier 1, a detail of the organic sheet O present in this case without the molded-on thermoplastics material. On the section composed of organic sheet O which adjoins the pedestal S2, there is formed a bearing section in the form of a bearing lug 30 for the later rotatable mounting of a cable roller of a window regulator. On the bearing lug 30 there is formed a bore or a hole 3c with a collar 3cc which protrudes on the inner side of the bearing lug 30 and which is formed from organic sheet O. Into said hole 3c there is inserted a bearing sleeve H which is fixed in the hole 3c by the molded-on thermoplastics material. The bearing sleeve H then serves for receiving a bolt for the rotatable mounting and axial securing of the cable roller. This is illustrated in more detail inter alia in the enlarged illustration of FIGS. 7C and 7D.

The molded-on thermoplastics material surrounding the bearing lug 30 transitions in said region seamlessly into the plastics material of the surface section A5 and the molded-on guide profile FP2. Also, any offset between the structures formed on the organic sheet O in said region is compensated by means of the molded-on thermoplastics material. Thus, on the organic sheet O, in particular in the region of the bearing lug 30 and the attachment region 3d adjoining said bearing lug, multiple regions of the organic sheet O do not lie in a common plane, but rather are offset with respect to one another in particular transversely with respect to a main plane of the module carrier 1 spanned by the organic sheet O. Here, an offset of said type is compensated by means of the plastics material molded on at the edge side, and in particular, a rectilinearly running sealing channel, which adjoins adjacent sections situated in a sealing plane, is formed by the receptacle 12.

Here, in particular, free spaces between mutually adjoining regions of the organic sheet O, which have arisen as a result of local cutting-open of the organic sheet O and subsequent formation of a material region, such as for example of the bearing lug 30, are closed by the molded-on thermoplastics material. Furthermore, a bearing point 18a is formed, and a stiffening structure 11 with multiple stiffening webs or ribs is formed, by the thermoplastics material molded on in the region of the bearing lug 30.

The detail illustration in FIGS. 8A and 8B shows in particular the fixing of a cable roller SR to the bearing point 18a, formed by thermoplastics material, in the region of the upper end of the guide rail FS1*. Here, a bearing lug 30 is formed by the organic sheet O also at that end of the pedestal 51 for the guide rail FS1* which is close to the edge. Thermoplastics material is molded onto said bearing lug 30 in order to form, by means of a sleeve-like projection, the bearing point 18a for the cable roller SR. For stiffening purposes, the bearing lug 30 is furthermore back-molded with thermoplastics material, which forms multiple ribs of a stiffening structure 11. The cable roller SR for the diversion of the cable pull Z is rotatably mounted by means of the bearing point 18a, which is formed substantially analogously to a bearing point as per FIGS. 7A to 7D. For this purpose, the cable roller SR is mounted onto the sleeve-like projection of the bearing point 18a composed of thermoplastics material and is secured axially thereon by means of a clipped-on bolt B.

Figure 9B:
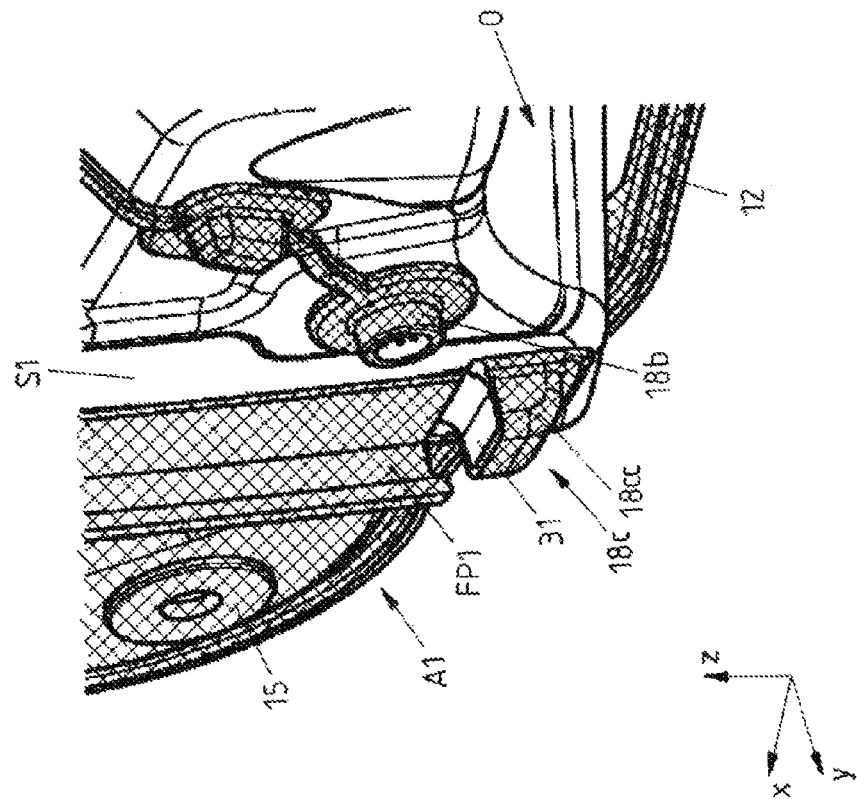
FIG. 9B shows, in a view similar to FIG. 9A, the module carrier with thermoplastics material molded onto the organic sheet.
Figure 9A:
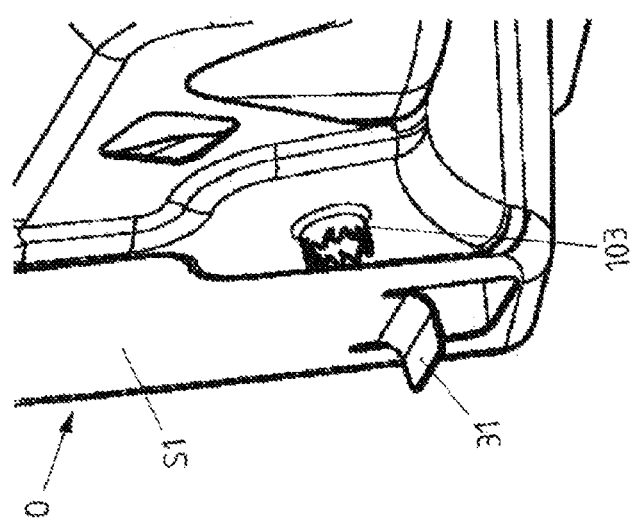
FIG. 9A shows an enlarged detail of the organic sheet from FIG. 6C in a view directed toward a lower region for a guide rail provided on the module carrier.

FIGS. 9A and 9B show, on the one hand, an enlarged detail of the surface section A1 composed of thermoplastics material and a lower end of the guide rail FS1*. Here, FIGS. 9A and 9B show that a stop region 31 is formed, by means of a formed-out material region of the organic sheet O, at a region composed of organic sheet O which adjoins the pedestal S1. The stop region is formed in this case as a stop lug 31 which has been cut into the organic sheet O by means of a U-shaped cut and which has been bent out transversely with respect to the main plane spanned by the organic sheet O.

To form a stop element 18c by means of which a lower adjustment position of a driver M1 (or M2) along the guide rail FS1* (or FS2*) is predefined, thermoplastics material is molded onto the stop lug 31. Said plastics material then forms a support structure 18cc that lies in the adjustment direction of the driver M1 (M2), and here, fills a free space which is formed as a result of the stop lug 31 being formed out of the organic sheet O. In this way, the bearing lug 31, connected to those regions of organic sheet O which adjoin it, is stabilized in its position.

A turned-out portion 103 for defining a further bearing point 18b for a further cable roller is also formed, transversely with respect to the direction of longitudinal extent of the pedestal S1, on the organic sheet O. Said turned-out portion 103 has an irregular contour on its free protruding end. In the present case, the end has multiple serrations. In this way, an improved rotationally fixed connection of the molded-on thermoplastics material to the turned-out portion 103 composed of organic sheet O is achieved. It is thus then the case here that the turned-out portion 103 is connected not only cohesively but also in positively locking fashion to the molded-on thermoplastics material.

By means of the combination of an organic sheet O which is at least partially already equipped with formed-out portions and regions of thermoplastics material molded onto said organic sheet partially over a relatively large area, in order firstly to form interfaces and passage openings for functional elements and a seal edge, it is possible to produce a module carrier 1 which has a relatively low weight and which can possibly also be more easily optimized with regard to loading. By virtue of the fact that any passage and/or fastening openings do not have to be formed, or at least do not have to be formed exclusively, by the organic sheet O itself, but rather can be formed by thermoplastics material molded thereon, it is possible for passage and fastening openings with relatively narrow tolerances to be realized more easily by means of the thermoplastics material.

LIST OF REFERENCE DESIGNATIONS

1 Module carrier
100a-100h Passage opening
101 Positioning peg (interface)
102 Wall
103 Turned-out portion
10a, 10b, 10c Fastening point for guide rail (interface)
10aa, 10bb, 10cc Bearing/supporting surface (interface)
10d, 10e Fastening opening/screw boss (interface)
10f Fastening opening for window regulator drive (interface)
11 Support or stiffening structure
12 Receptacle for seal
13 Fastening point for loudspeaker (interface)
14 Fastening point for control unit (interface)
15 Fastening opening for connection to the door inner panel (interface)
16 Fastening opening for door inner lining (interface)
17a Fastening point for airbag sensor (interface)
17b Fastening point for door pull-closed handle (interface)
18a, 18b Bearing point for diverting element (interface)
18c, 18d Stop element
18cc Molded-on support structure for stop element
19 Bearing point for window regulator drive
190 Sound-insulating wall (functional element)
2a, 2b Seal element
30 Bearing lug (bearing section)
31 Stop lug (stop region)
3a Cutout
3b Sleeve-shaped projection/rim hole
3c Hole
3cc Collar
3d Attachment region
5 Door structure
50 Window frame structure
51 Door case
510 Door inner panel
52 Breast delimitation
A Cutout
A1-A5 Molded-on edge-side surface section
B Bolt
FP1, FP2 Guide profile
FS1, FS1*, FS2, FS2* Guide rail
H Bearing sleeve
K1, K2 Channel
M Bearing plate with cable drum
M1, M2 Driver
O Organic sheet
R Edge of the organic sheet
R1, R2, R5 Edge section
S1, S2 Pedestal/stability profile
SR Cable roller (diverting element)
T Door module
Z Cable pull (traction mechanism)

The invention claimed is:

1. A module carrier for a door module of a motor vehicle door, wherein at least one functional element is to be fixed to the module carrier, and wherein the module carrier is formed substantially by an organic sheet including a thermoplastics material reinforced with embedded endless fibers and is delimited by an encircling outer edge including at least one sealing element, the module carrier comprising:
a multiplicity of interfaces firstly for fixing the module carrier to a door structure of the motor vehicle door and secondly for connecting the at least one functional element or further components of the door module to the module carrier;
at least one first molded-on portion composed solely of thermoplastics material on the outer edge of the module carrier, the first molded-on portion at least partially bordering a central region of the module carrier and defining at least one interface of the multiplicity of interfaces for fixing of the module carrier to the door structure of the motor vehicle door, for fixing of a further component of the motor vehicle door to the module carrier or for receiving or forming an edge-side seal element of the module carrier, wherein the at least one first molded-on portion is provided at an edge of the organic sheet that includes the thermoplastic materials reinforced with embedded endless fibers to supplement the organic sheet, the at least one first molded-on portion defining a surface of the module carrier and forming a portion of the outer edge of the module carrier absent the organic sheet, and
at least one second molded-on portion composed solely of thermoplastics material at least in the central region of the module carrier, the second molded-on portion defining an interface for the at least one functional element to be fixed to the module carrier, defining a passage opening, or forming at least one section of a functional element.

2. The module carrier as claimed in claim 1, wherein the at least one first molded-on portion forms at least one areally extending section of the module carrier or extends along an entire outer edge of the module carrier.

3. The module carrier as claimed in claim 1, wherein the at least one first molded-on portion forms at least one receptacle which is configured to at least partially receive the at least one sealing element.

4. The module carrier as claimed in claim 1, wherein the at least one of the first molded-on portion forms at least one interface for fixing of a loudspeaker to the module carrier or forms a screw boss.

5. The module carrier as claimed claim 1, wherein the at least one second molded-on portion forms at least one of:

an interface for fixing of a guide rail of a window regulator,
an interface for fixing of a drive of the window regulator,
an interface for fixing of a control unit,
an interface for fixing of an airbag sensor,
an interface for fixing of a door pull-closed handle,
an interface for fixing of a diverting element over which a traction mechanism of the window regulator is diverted, and
a sound-insulating wall.

6. The module carrier as claimed in claim 1, wherein the at least one second molded-on portion forms a passage opening for a leadthrough of a cable or of a linkage, forms a drive shaft of a drive for a window regulator through the module carrier, or forms a passage opening for a tool for mounting of a window regulator on the module carrier.

7. The module carrier as claimed in claim 1, wherein the at least one second molded-on portion forms at least one section of a guide rail of a window regulator.

8. The module carrier as claimed in claim 7, wherein the at least one second molded-on portion forms a guide profile of the guide rail, the guide profile predefining a guide track for a driver guided displaceably on the guide rail.

9. The module carrier as claimed in claim 8, wherein the guide profile is molded onto a stability profile of the guide rail, which stability profile is designed to accommodate forces that arise during the operation of the window regulator and is formed by a longitudinally extending pedestal composed of the organic sheet and which protrudes on the module carrier.

10. The module carrier as claimed in claim 9, wherein the thermoplastics material for the guide profile is molded at least partially through the organic sheet of the pedestal.

11. The module carrier as claimed in claim 5, wherein a guide profile is molded onto a stability profile of the guide rail, which stability profile is designed to accommodate forces that arise during operation of the window regulator and is formed by a longitudinally extending pedestal composed of the organic sheet which protrudes on the module carrier, and a bearing section formed out of the organic sheet which adjoins the pedestal along a direction of longitudinal extent of said pedestal and, on said bearing section, an interface for fixing of a diverting element is formed by a molded-on portion composed of thermoplastics material.

12. The module carrier as claimed in claim 5, wherein a guide profile is molded onto a stability profile of the guide rail, which stability profile is designed to accommodate forces that arise during operation of the window regulator and is formed by a longitudinally extending pedestal composed of the organic sheet which protrudes on the module carrier, and a stop region formed out of the organic sheet, and which adjoins the pedestal along a direction of longitudinal extent of said pedestal and which serves for delimiting an adjustment travel of the driver and wherein a molded-on portion composed of thermoplastics material is provided on said stop region for forming a stop element for the driver.

13. The module carrier as claimed in claim 1, wherein:
at least one section of a guide rail as a functional element of the module carrier is formed by a longitudinally extending pedestal which protrudes on the module carrier and which is composed of the organic sheet, or a longitudinally extending pedestal which protrudes on the module carrier and which is composed of the organic sheet defines an interface for fixing of the guide rail, and the pedestal protrudes on a first side of the module carrier and, on an opposite, second side of the module carrier, defines a longitudinally extending channel.

14. The module carrier as claimed in claim 1, wherein the at least one second molded-on portion forms at least one support or stiffening structure for locally increasing a load-bearing capacity or stiffness.

15. The module carrier as claimed in claim 5, wherein the at least one second molded-on portion forms at least one support or stiffening structure for locally increasing a load-bearing capacity or stiffness of an interface for fixing of a door pulled-closed handle, which support or stiffening structure is provided with at least one rib.

16. The module carrier as claimed in claim 1, wherein a wall of the module carrier, which wall adjoins an interface, formed from molded-on thermoplastics material, for fixing of a loudspeaker, is formed such that said wall extends at least in sections in the form of an angled portion out of a main plane of the module carrier, along which the module carrier extends substantially areally, in the direction of an interface, formed from molded-on thermoplastics material, for fixing of a guide rail, and said wall forms a support structure for support of the interface for fixing of the guide rail.

17. The module carrier as claimed in claim 1, wherein the at least one first molded-on portion or the at least one second molded-on portion engages around an edge of the organic sheet or an edge of a passage opening in the organic sheet at least in one section, such that the respective edge is encapsulated with thermoplastics material of the at least one first molded-on portion or the at least one second molded-on portion in the at least one section.

18. The module carrier as claimed in claim 1, wherein at least one passage opening for a leadthrough of a cable or of a linkage through the module carrier, or a passage opening for a mounting of a window regulator on the module carrier is formed in the at least one first molded-on portion;
wherein the at least one first molded-on portion forms at least one interface for fixing of a loudspeaker to the module carrier or a screw boss.

19. The module carrier as claimed in claim 1, wherein a fastening opening is present in the at least one first molded-on portion as an interface for fixing the module carrier to a door structure, wherein the fastening opening is formed completely and solely by the thermoplastics material of the at least one first molded-on portion at the outer edge of the module carrier, the organic sheet thereby not forming a part of the interface for fixing the module carrier to the door structure.

20. A module carrier for a door module of a motor vehicle door, wherein at least one functional element is to be fixed to the module carrier, and wherein the module carrier is formed substantially by an organic sheet and is delimited by an encircling outer edge including at least one sealing element, the module carrier comprising:
a multiplicity of interfaces firstly for fixing the module carrier to a door structure of the motor vehicle door and secondly for connecting the at least one functional element or further components of the door module to the module carrier;
at least one first molded-on portion composed of thermoplastics material on the outer edge of the module carrier, the first molded-on portion at least partially bordering a central region of the module carrier and defining at least one interface of the multiplicity of interfaces for fixing of the module carrier to the door structure of the motor vehicle door, for fixing of a further component of the motor vehicle door to the module carrier or for receiving or forming an edge-side seal element of the module carrier, wherein the at least one first molded-on portion is provided at an edge of the organic sheet to supplement the organic sheet, the at least one first molded-on portion defining a surface of the module carrier and forming a portion of the outer edge of the module carrier absent the organic sheet, and at least one second molded-on portion composed of thermoplastics material at least in the central region of the module carrier which defines an interface for the at least one functional element to be fixed to the module carrier, which defines a passage opening, or which forms at least one section of a functional element, wherein the second molded-on portion forms a guide profile of a guide rail of a window regulator, the guide profile predefining a guide track for a driver guided displaceably on the guide rail, and wherein the guide profile is molded onto a stability profile of the guide rail, which stability profile is designed to accommodate forces that arise during operation of the window regulator and is formed by a longitudinally extending pedestal composed of the organic sheet which protrudes on the module carrier.

21. A module carrier for a door module of a motor vehicle door, wherein at least one functional element is to be fixed to the module carrier, and wherein the module carrier is formed substantially by an organic sheet and is delimited by an encircling outer edge including at least one sealing element, the module carrier comprising:

a multiplicity of interfaces firstly for fixing the module carrier to a door structure of the motor vehicle door and secondly for connecting the at least one functional element or further components of the door module to the module carrier;

at least one first molded-on portion composed of thermoplastics material on the outer edge of the module carrier, the first molded-on portion at least partially bordering a central region of the module carrier and defining at least one interface of the multiplicity of interfaces for fixing of the module carrier to the door structure of the motor vehicle door, for fixing of a further component of the motor vehicle door to the module carrier or for receiving or forming an edge-side seal element of the module carrier, wherein the at least one first molded-on portion is provided at an edge of the organic sheet to supplement the organic sheet, the at least one first molded-on portion defining a surface of the module carrier and forming a portion of the outer edge of the module carrier absent the organic sheet, and at least one second molded-on portion composed of thermoplastics material at least in the central region of the module carrier, the second molded-on portion defining an interface for the at least one functional element to be fixed to the module carrier, defining a passage opening, or forming at least one section of a functional element, wherein the second molded-on portion forms at least one of an interface for fixing of a guide rail of a window regulator, and wherein a guide profile is molded onto a stability profile of the guide rail, which stability profile is designed to accommodate forces that arise during operation of the window regulator and is formed by a longitudinally extending pedestal composed of the organic sheet which protrudes on the module carrier, and a bearing section formed out of the organic sheet which adjoins the pedestal along a direction of longitudinal extent of said pedestal and, on said bearing section, an interface for fixing of a diverting element is formed by a molded-on portion composed of thermoplastics material.

22. A module carrier for a door module of a motor vehicle door, wherein at least one functional element is to be fixed to the module carrier, and wherein the module carrier is formed substantially by an organic sheet and is delimited by an encircling outer edge including at least one sealing element, the module carrier comprising:

a multiplicity of interfaces firstly for fixing the module carrier to a door structure of the motor vehicle door and secondly for connecting the at least one functional element or further components of the door module to the module carrier;

at least one first molded-on portion composed of thermoplastics material on the outer edge of the module carrier, the first molded-on portion at least partially bordering a central region of the module carrier and defining at least one interface of the multiplicity of interfaces for fixing of the module carrier to the door structure of the motor vehicle door, for fixing of a further component of the motor vehicle door to the module carrier or for receiving or forming an edge-side seal element of the module carrier, wherein the at least one first molded-on portion is provided at an edge of the organic sheet to supplement the organic sheet, the at least one first molded-on portion defining a surface of the module carrier and forming a portion of the outer edge of the module carrier absent the organic sheet, and at least one second molded-on portion composed of thermoplastics material at least in the central region of the module carrier, the second molded-on portion defining an interface for the at least one functional element to be fixed to the module carrier, defining a passage opening, or forming at least one section of a functional element, wherein the second molded-on portion forms a guide profile of a guide rail of a window regulator, the guide profile predefining a guide track for a driver guided displaceably on the guide rail, and wherein a guide profile is molded onto a stability profile of the guide rail, which stability profile is designed to accommodate forces that arise during operation of the window regulator and is formed by a longitudinally extending pedestal composed of the organic sheet which protrudes on the module carrier, and a stop region formed out of the organic sheet, and which adjoins the pedestal along a direction of longitudinal extent of said pedestal and which serves for delimiting an adjustment travel of the driver and wherein a molded-on portion composed of thermoplastics material is provided on said stop region for forming a stop element for the driver.

* * * * *